Jan. 29, 1963   H. J. MUMMA   3,075,672
MACHINE FOR HANDLING EGGS
Original Filed Dec. 28, 1953   17 Sheets-Sheet 1
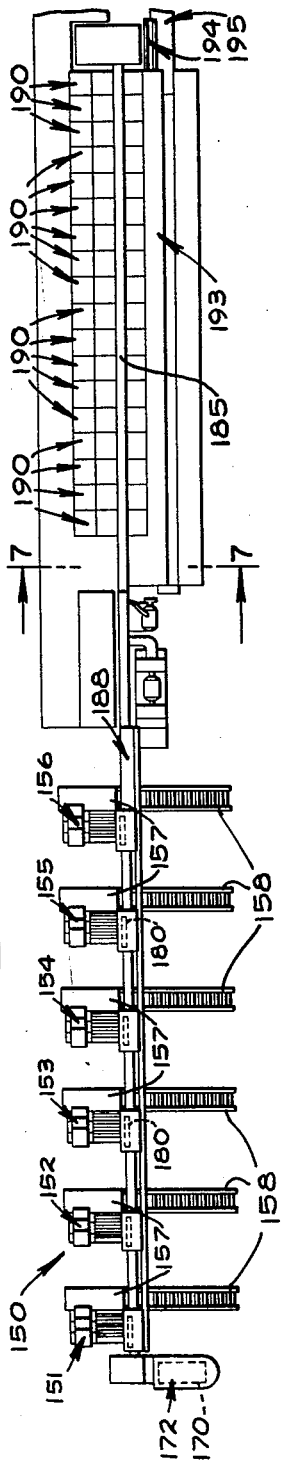
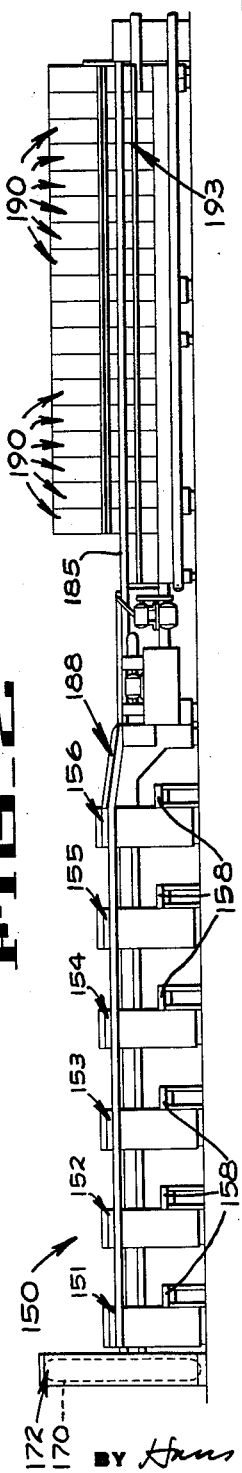
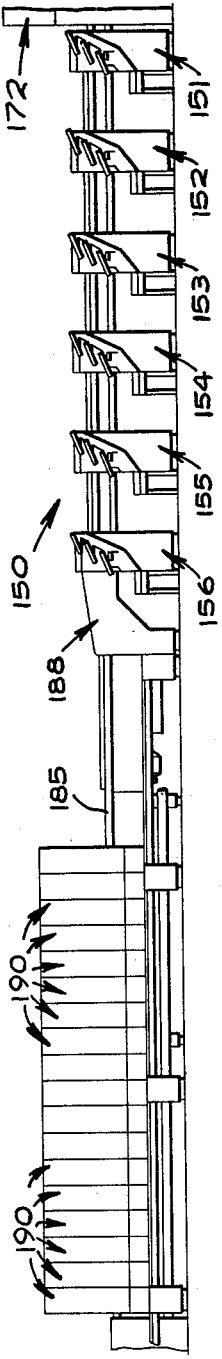
INVENTOR
HAROLD J. MUMMA
BY Hans G. Hoffmeister
ATTORNEY

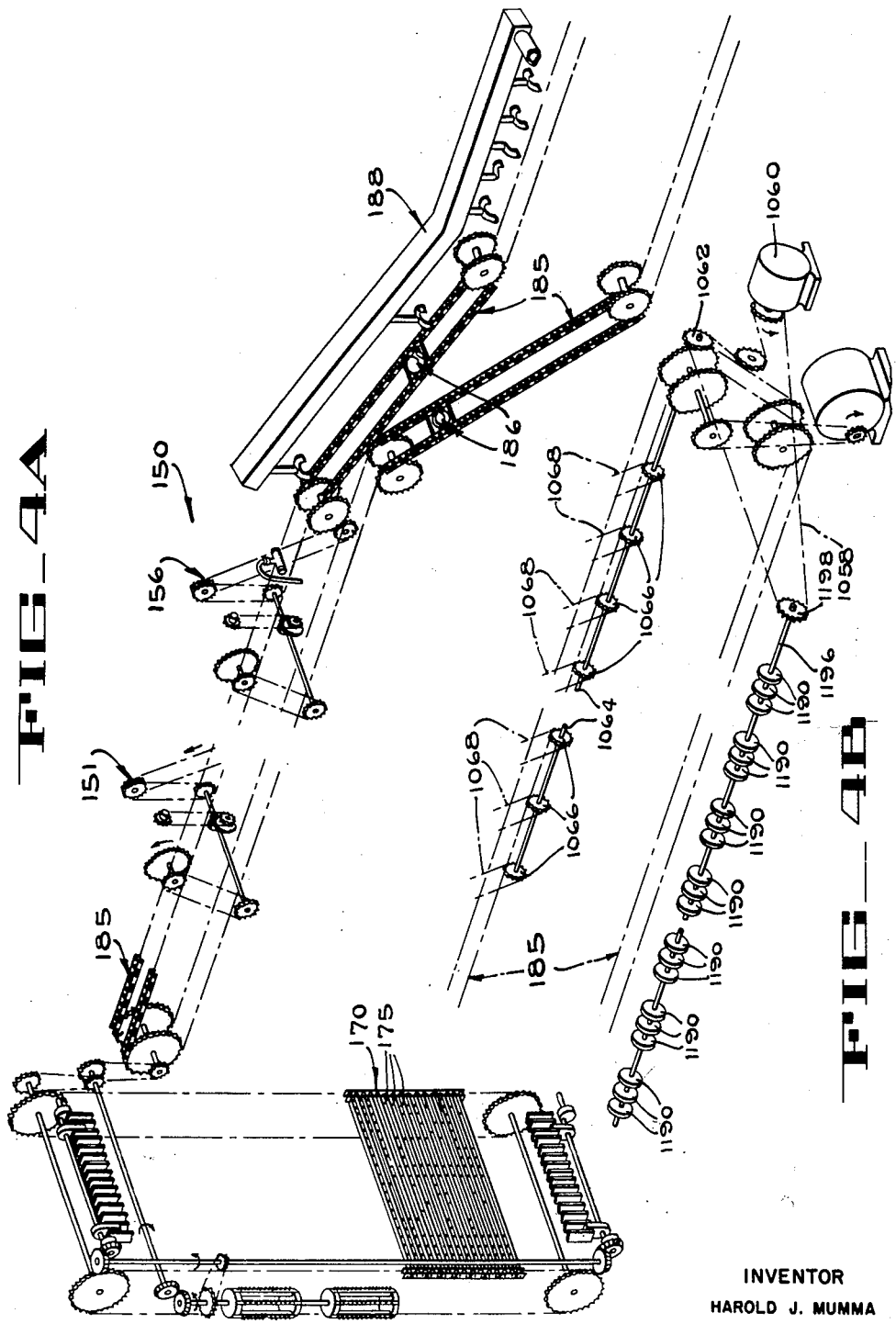

Jan. 29, 1963 H. J. MUMMA 3,075,672
MACHINE FOR HANDLING EGGS
Original Filed Dec. 28, 1953 17 Sheets-Sheet 3
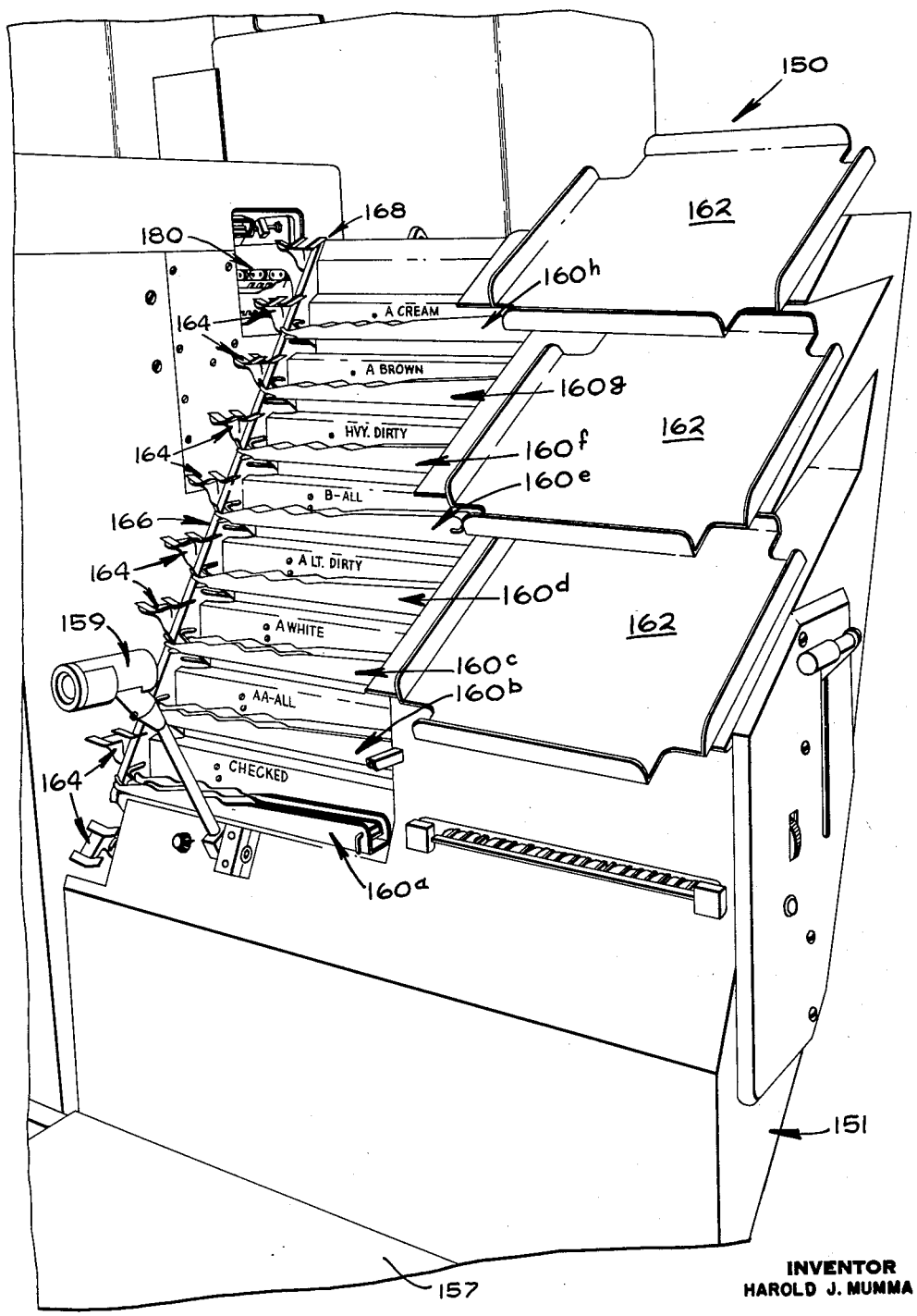
FIG_5
INVENTOR
HAROLD J. MUMMA
BY
ATTORNEY Jan. 29, 1963 H. J. MUMMA 3,075,672
MACHINE FOR HANDLING EGGS
Original Filed Dec. 28, 1953 17 Sheets-Sheet 4
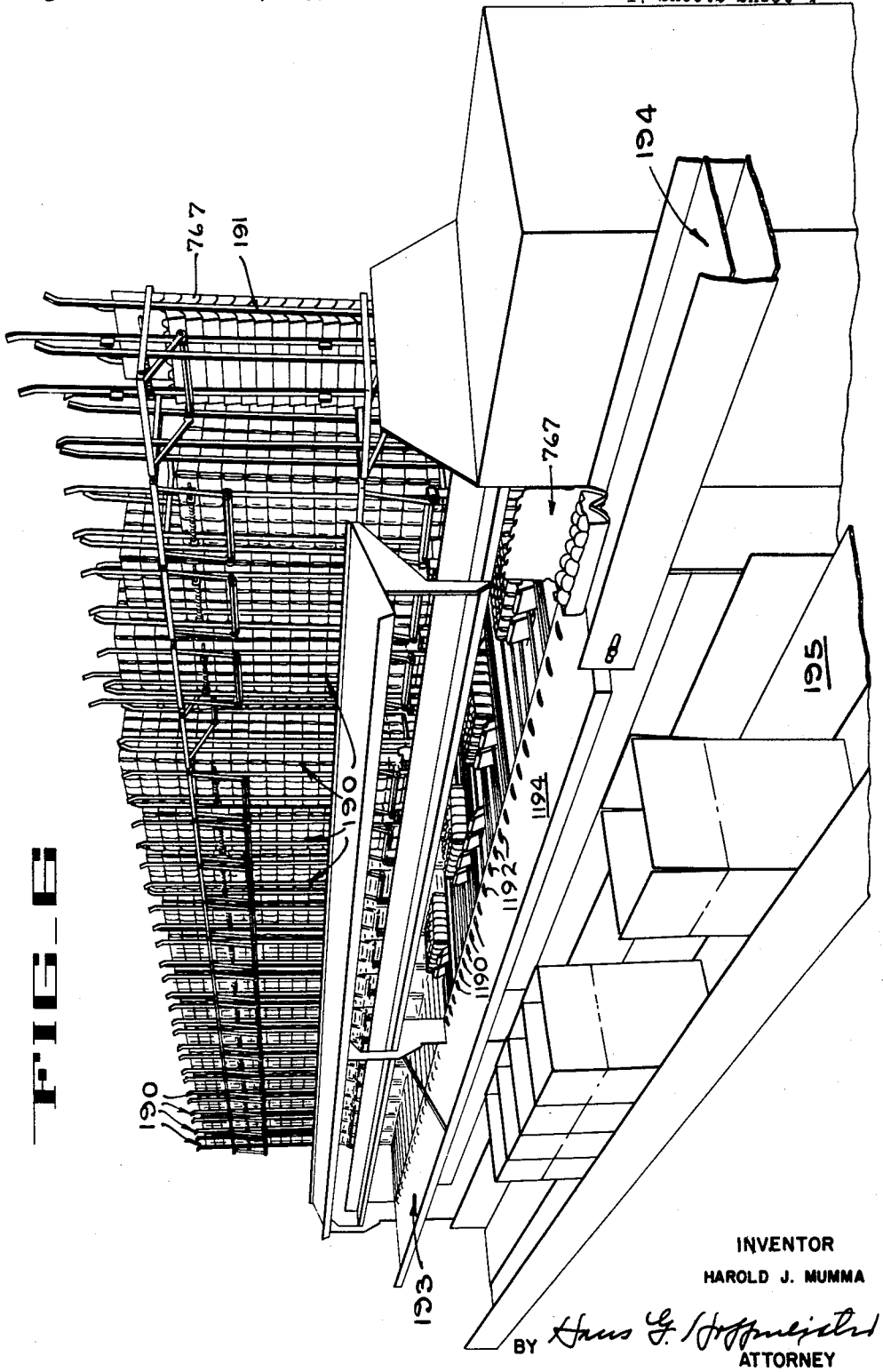
INVENTOR
HAROLD J. MUMMA
BY
ATTORNEY Jan. 29, 1963   H. J. MUMMA   3,075,672
MACHINE FOR HANDLING EGGS
Original Filed Dec. 28, 1953   17 Sheets-Sheet 5
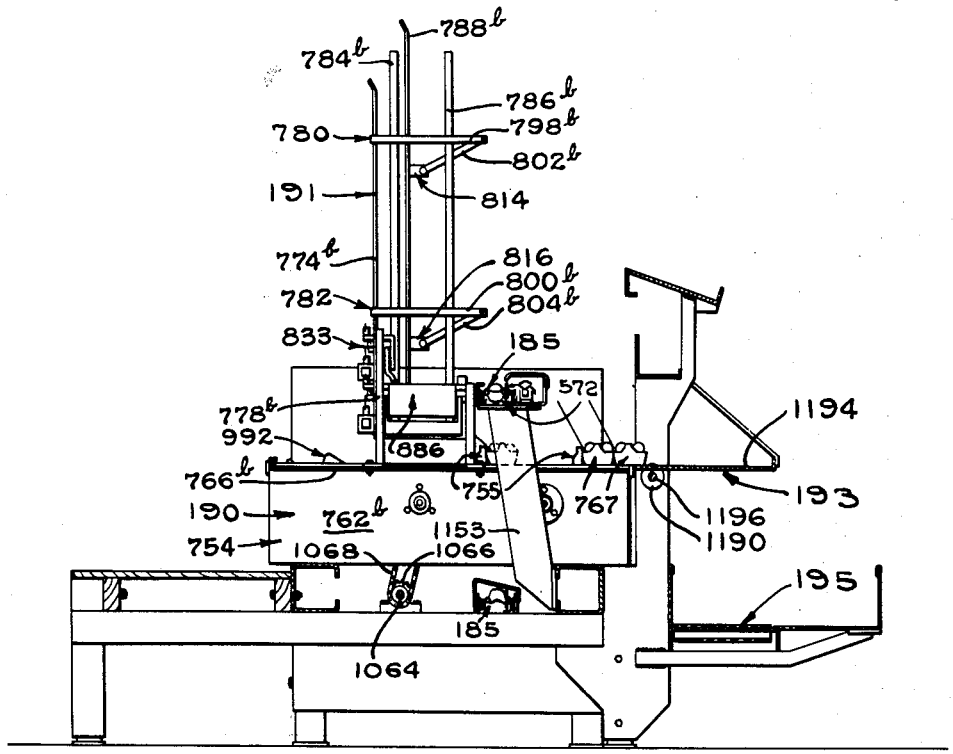
FIG_7
INVENTOR
HAROLD J. MUMMA
BY
ATTORNEY Jan. 29, 1963     H. J. MUMMA     3,075,672
MACHINE FOR HANDLING EGGS
Original Filed Dec. 28, 1953     17 Sheets-Sheet 6
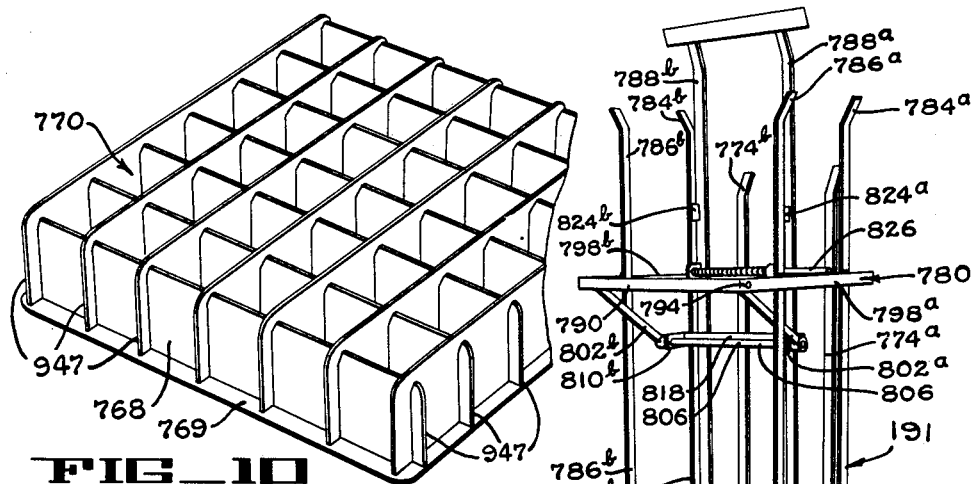
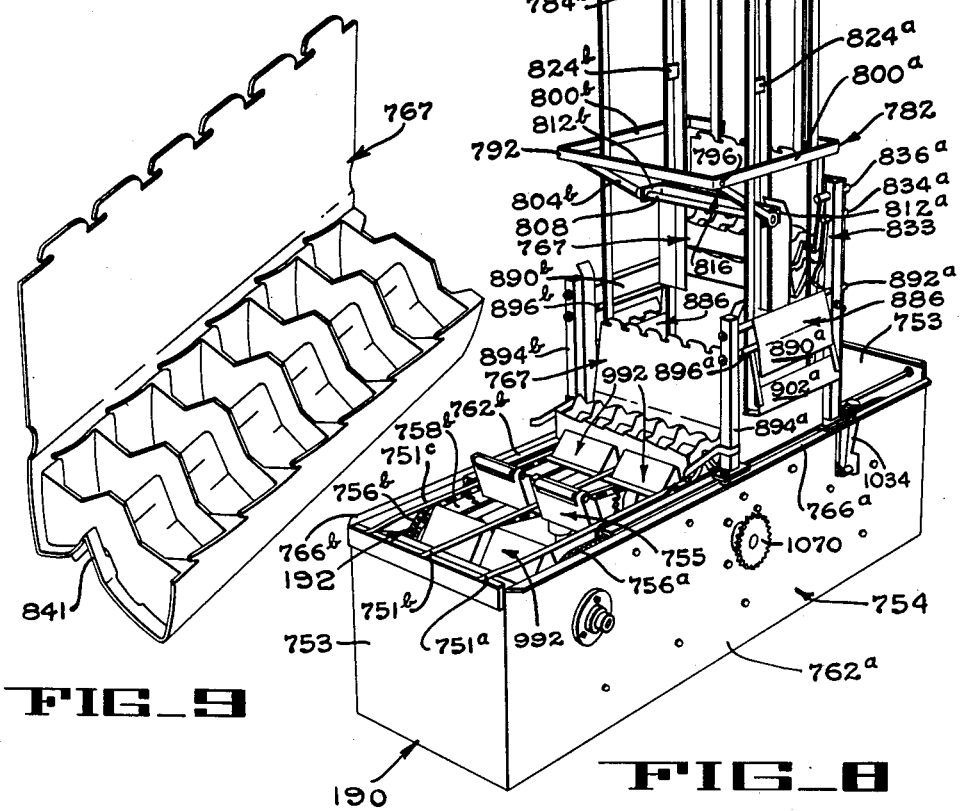
INVENTOR
HAROLD J. MUMMA
BY *Hans G. Hoffmeister*
ATTORNEY

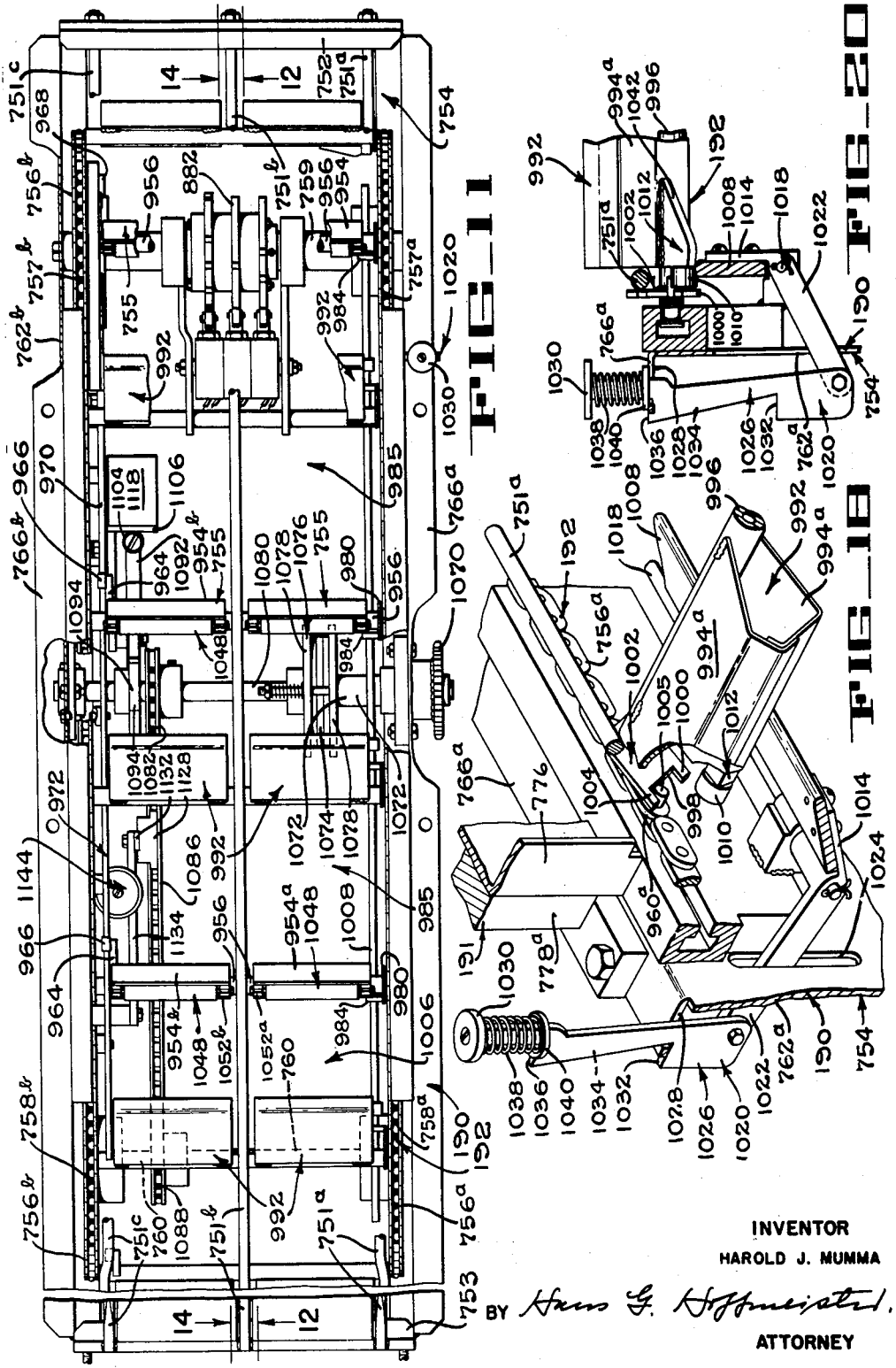

Jan. 29, 1963          H. J. MUMMA                3,075,672
                  MACHINE FOR HANDLING EGGS
Original Filed Dec. 28, 1953                    17 Sheets-Sheet 8
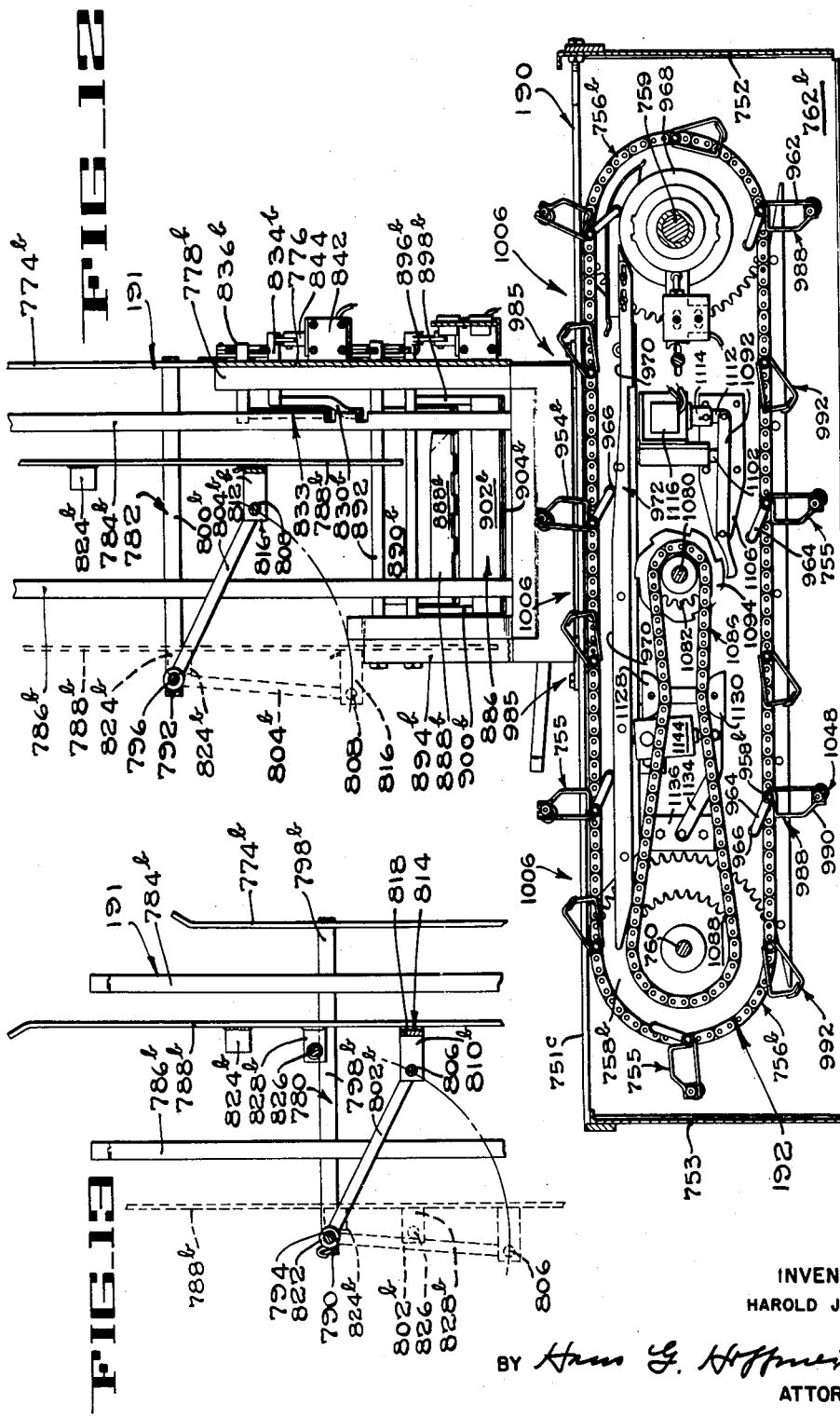
INVENTOR
HAROLD J. MUMMA
BY *Hans G. Hoffmeister*
ATTORNEY Jan. 29, 1963  H. J. MUMMA  3,075,672
MACHINE FOR HANDLING EGGS
Original Filed Dec. 28, 1953  17 Sheets-Sheet 9
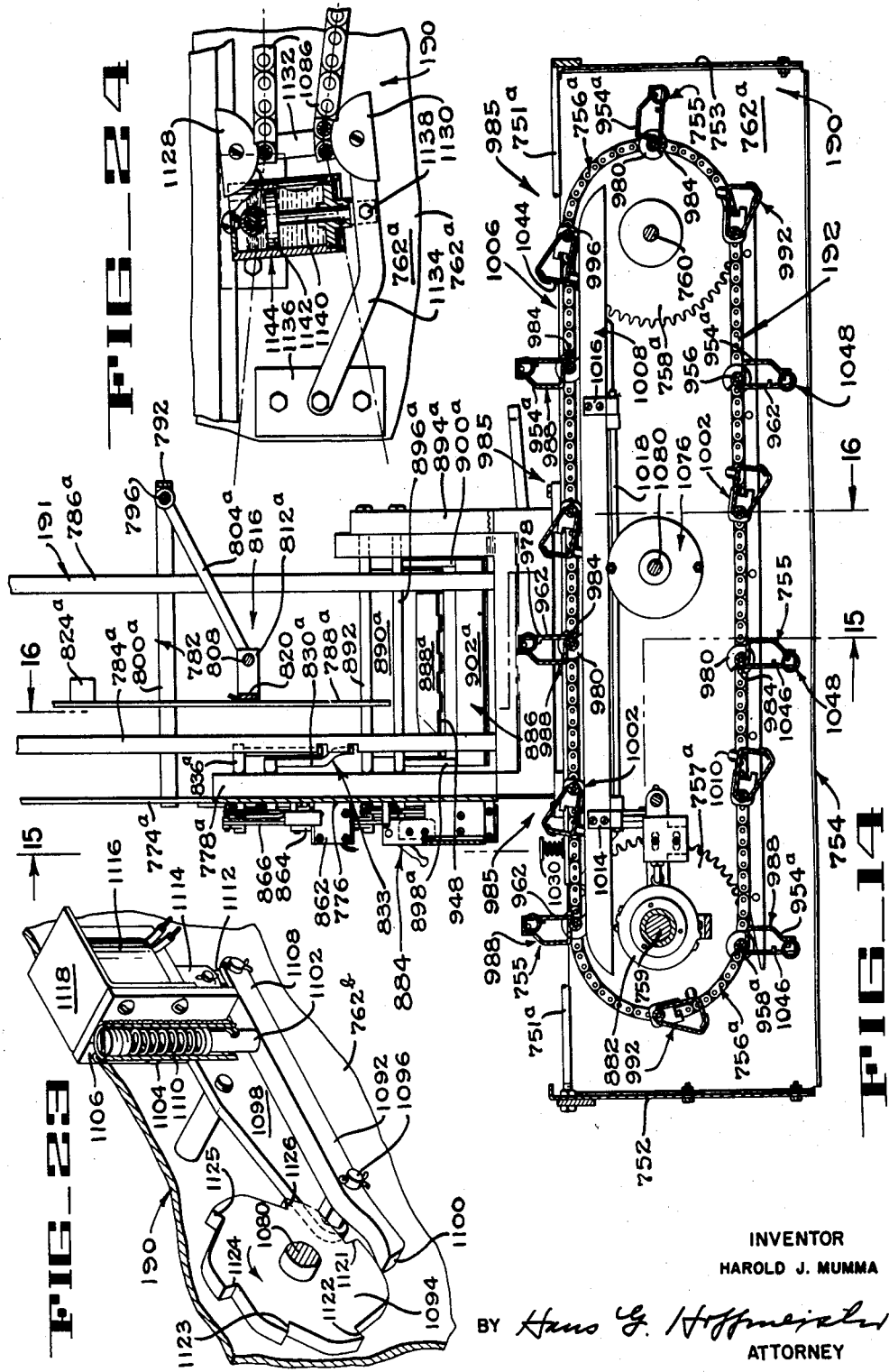
INVENTOR
HAROLD J. MUMMA
BY Hans G. Hoffmeister
ATTORNEY

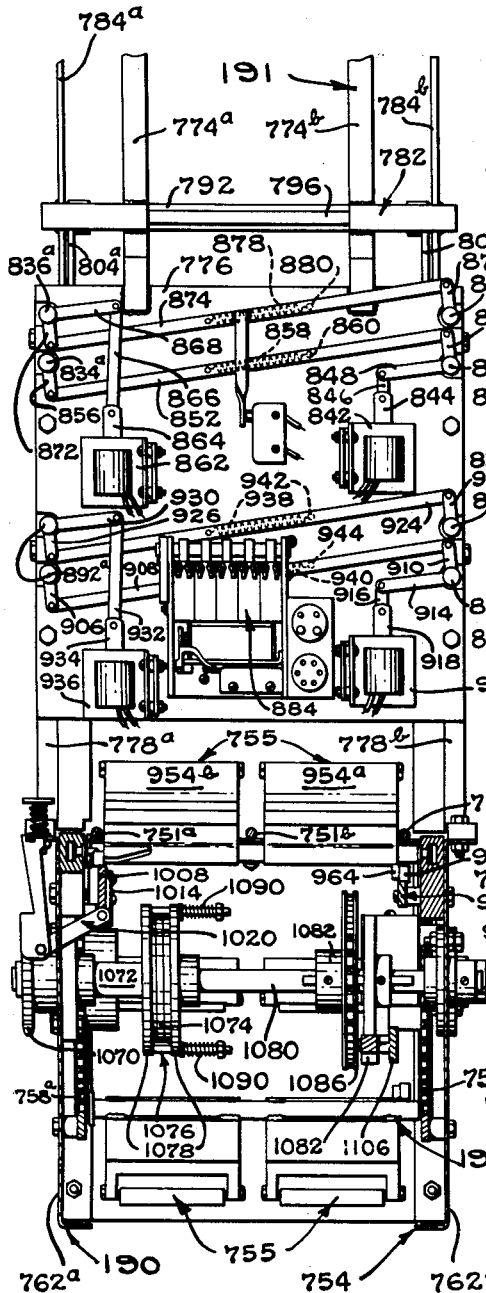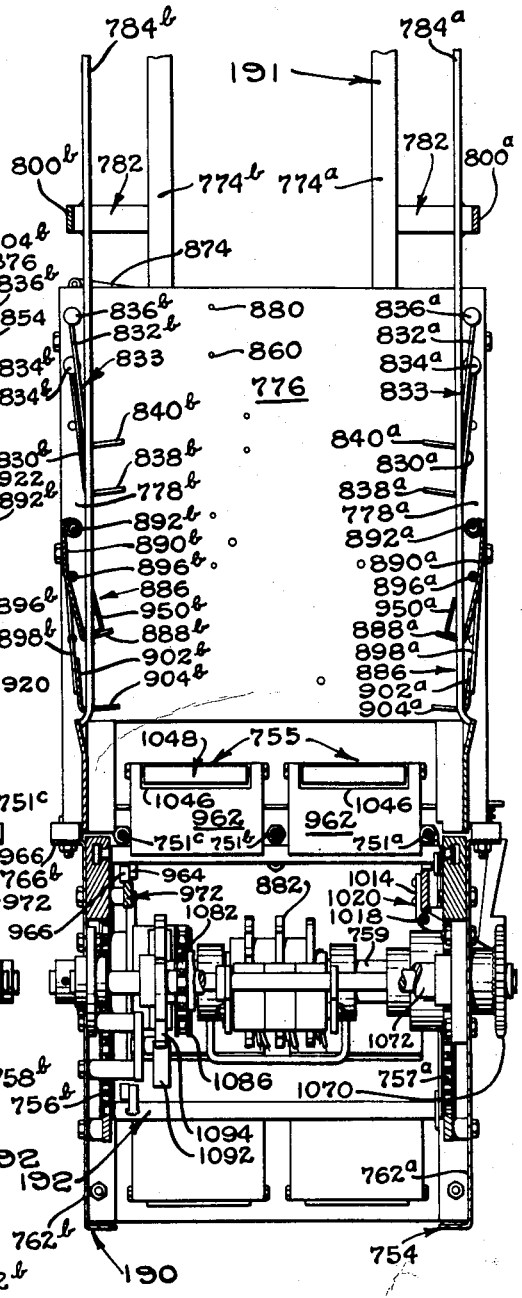

Jan. 29, 1963 H. J. MUMMA 3,075,672
MACHINE FOR HANDLING EGGS
Original Filed Dec. 28, 1953 17 Sheets-Sheet 11
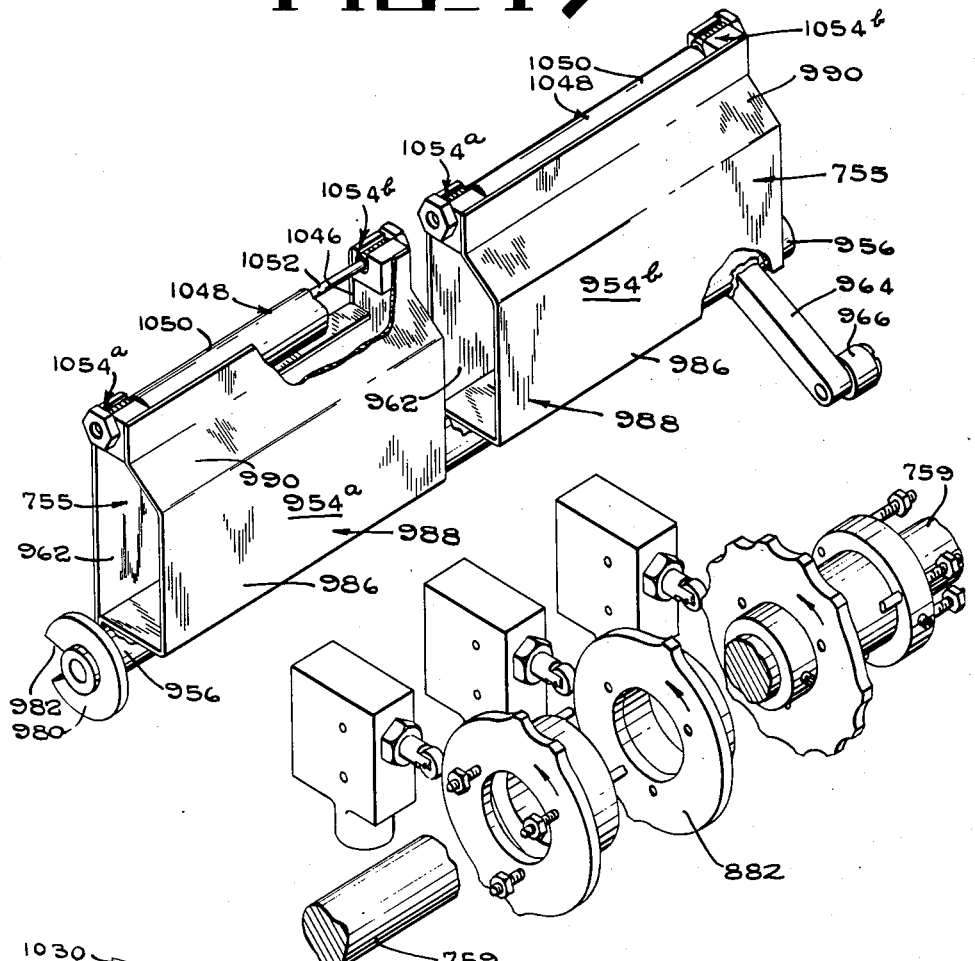
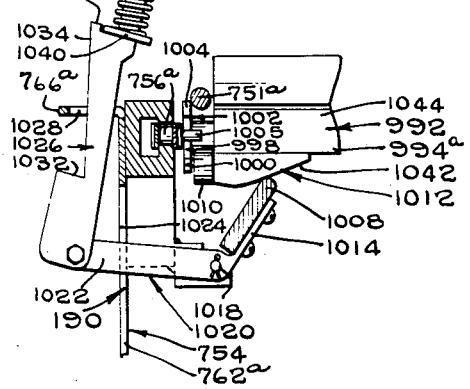
INVENTOR
HAROLD J. MUMMA
BY
ATTORNEY

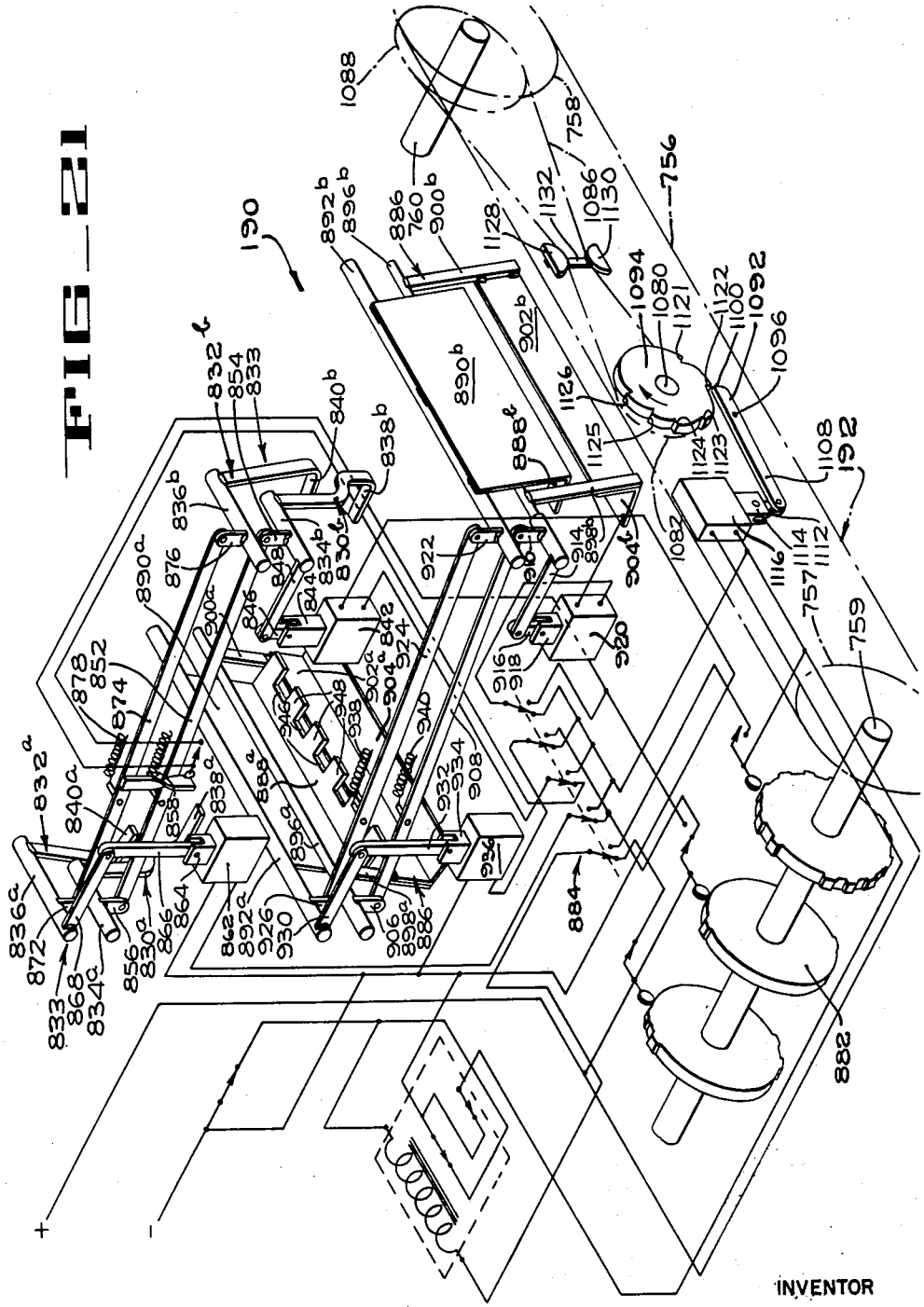

Jan. 29, 1963    H. J. MUMMA    3,075,672
MACHINE FOR HANDLING EGGS
Original Filed Dec. 28, 1953    17 Sheets-Sheet 13
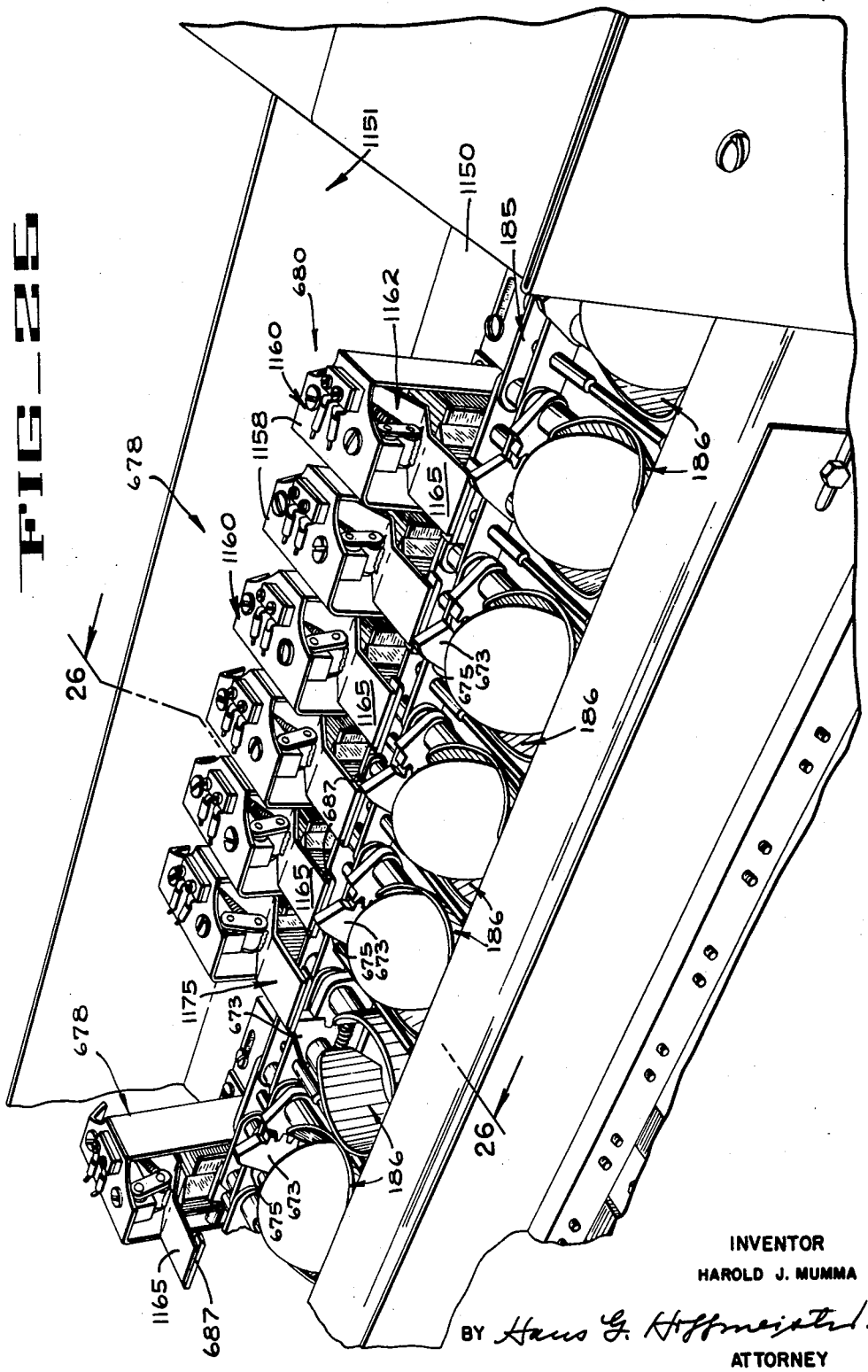
INVENTOR
HAROLD J. MUMMA
BY Hans G. Hoffmeister.
ATTORNEY

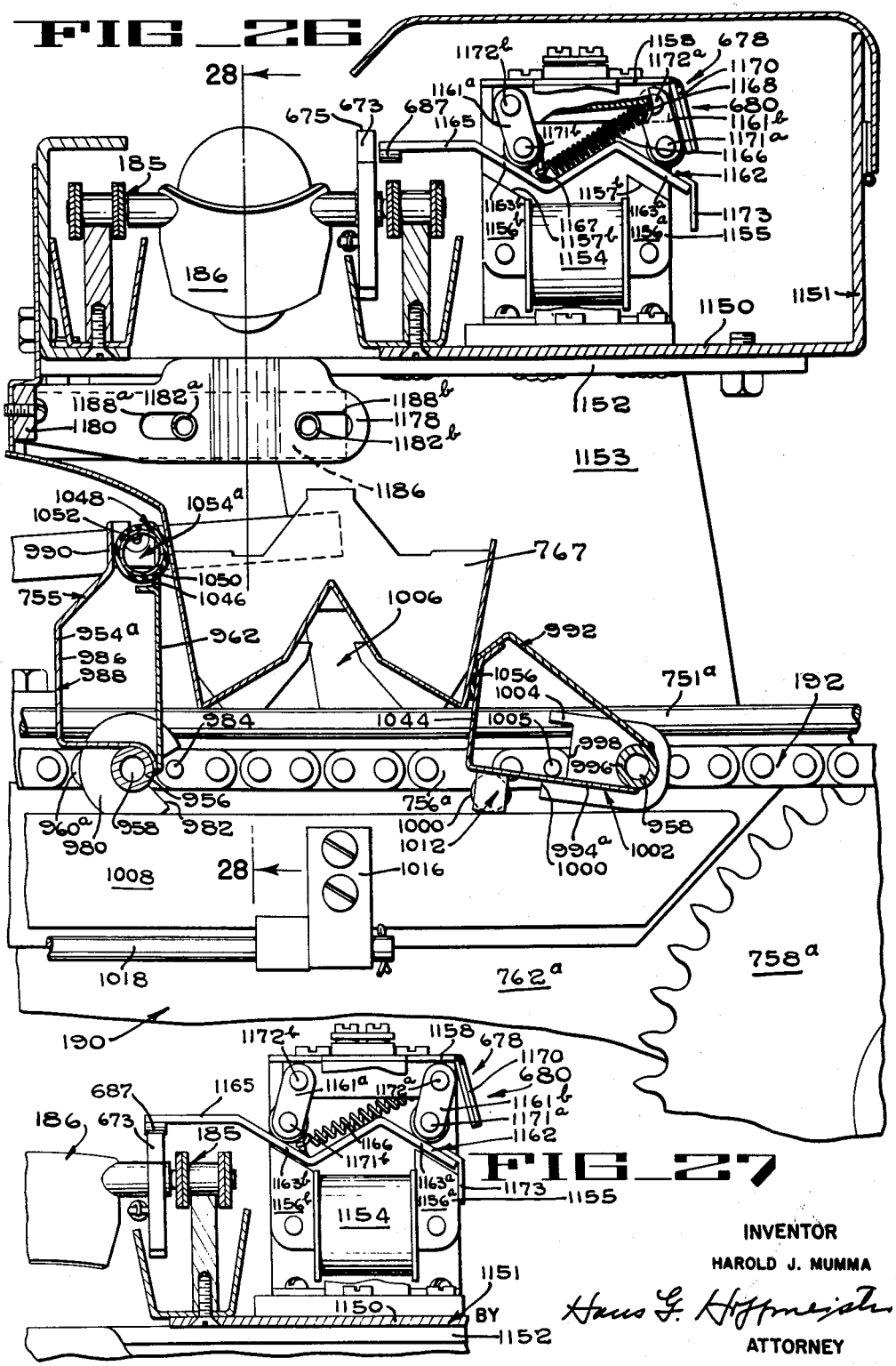

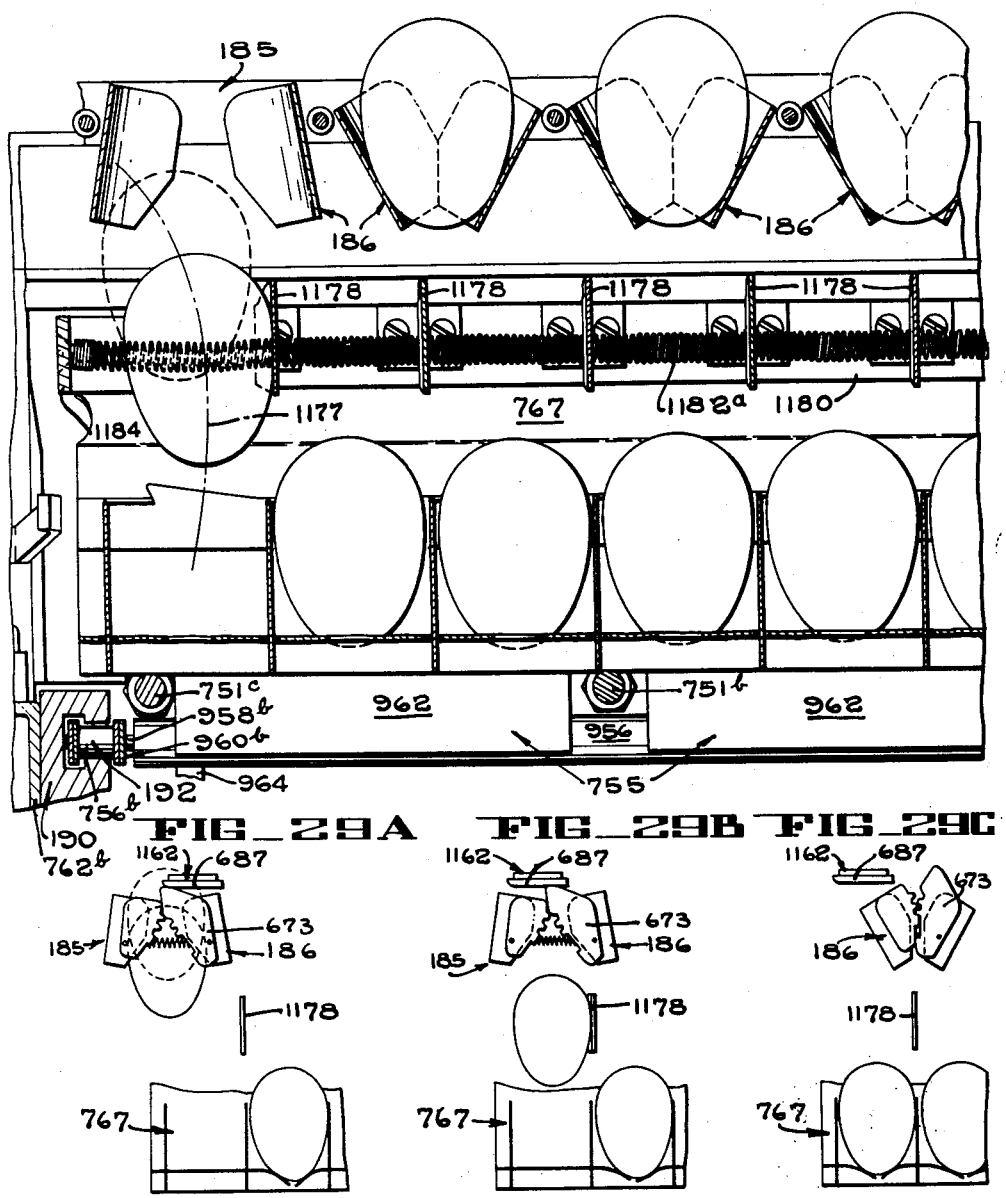

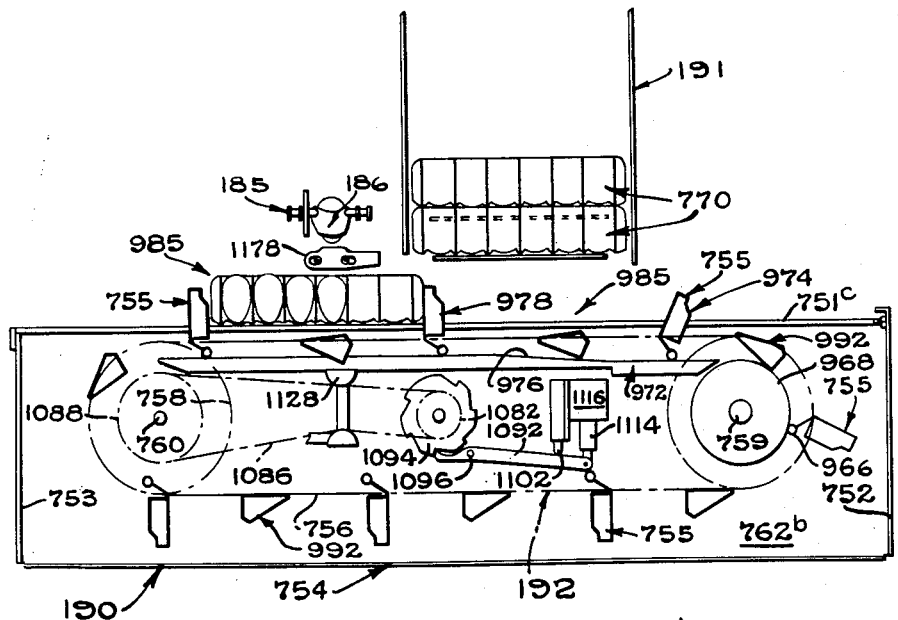
FIG_30 A
FIG_30 B
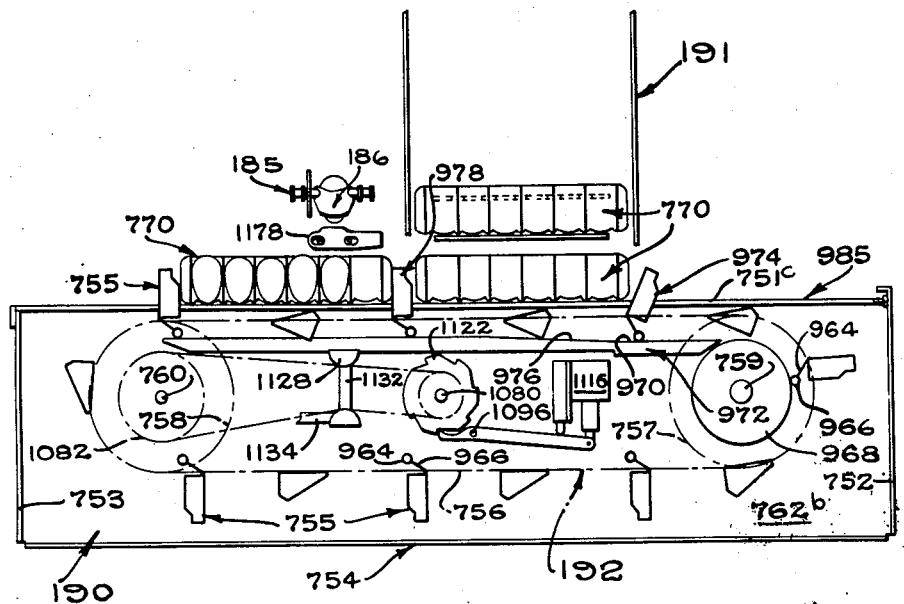

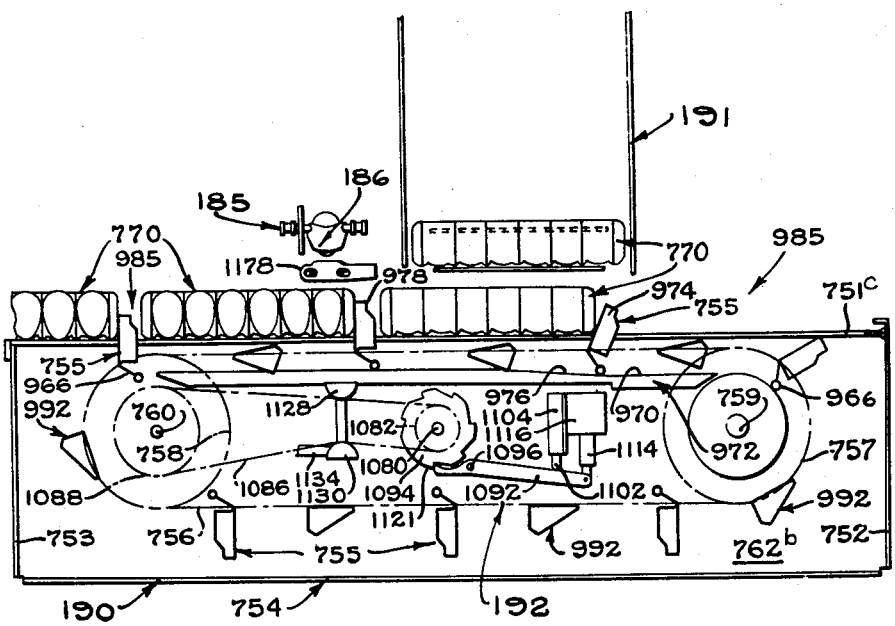
FIG_30C
FIG_30D
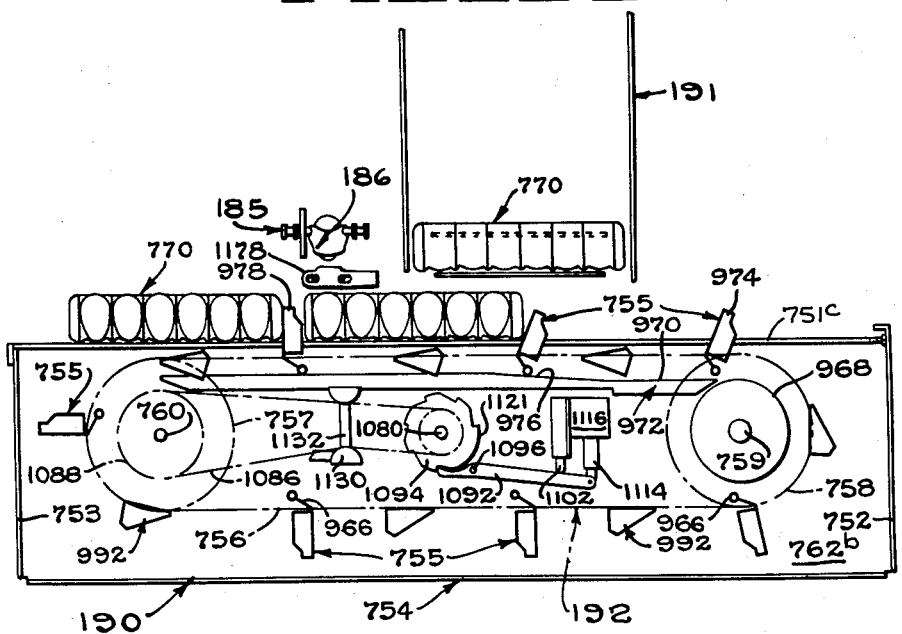
INVENTOR
HAROLD J. MUMMA
BY Hans G. Hoffmeister
ATTORNEY United States Patent Office 3,075,672
Patented Jan. 29, 1963

1

3,075,672
MACHINE FOR HANDLING EGGS
Harold J. Mumma, Riverside, Calif., assignor to FMC Corporation, a corporation of Delaware
Original application Dec. 28, 1953, Ser. No. 400,466, now Patent No. 2,895,274, dated July 21, 1959. Divided and this application July 16, 1959, Ser. No. 827,599
7 Claims. (Cl. 221—312)

The present invention relates to machines for handling articles such as eggs, and more particularly to an improved carton handling mechanism for article handling machines.

The present application is a division of Mumma application Serial No. 400,466 filed December 28, 1953, now U.S. Patent No. 2,895,274.

An object of the present invention is to provide an improved carton handling mechanism.

Another object is to provide means operable to place the individual pocket rows of multi-row egg cartons into egg receiving position relative to an egg supporting supply conveyor and to advance a successive pocket row of the carton into egg receiving position relative to the conveyor whenever a preceding pocket row has been filled with eggs from said conveyor.

Another object is to provide an efficient mechanism for dispensing cartons from a supply magazine.

Another object is to provide an improved carton supply magazine.

Another object is to provide an improved conveyor for advancing cartons in an egg handling machine.

Another object is to provide an improved drive mechanism for a carton supplying conveyor.

These and other objects of the present invention will be apparent from the following description of the accompanying drawings which illustrate a preferred embodiment thereof and wherein:

FIG. 1 is a schematic plan view of the complete egg handling machine of the invention.

FIG. 2 is a schematic side elevation of the machine shown in FIG. 1.

FIG 3 is a schematic side elevation of the same machine viewed from the side opposite to FIG. 2.

FIGS. 4A and 4B are the left and right halves of a fragmentary schematic perspective illustrating the mechanical power trains comprised in the machine of the invention.

FIG. 5 is a perspective of one of the candling stations comprised in the machine of the invention.

FIG. 6 is a perspective of eighteen packing stations associated with the terminal run of the distributing conveyor.

FIG. 7 is a transverse vertical section across the distributing conveyor taken along line 7—7 of FIG. 1 and looking toward the first of the eighteen packing stations.

FIG. 8 is a perspective of one of said packing stations.

FIG. 9 is a perspective of an egg carton that may be handled by the packing station illustrated in FIG. 8.

FIG. 10 is a fragmentary perspective of a cardboard grid and associated base plate that may likewise be handled by the packing station illustrated in FIG. 8.

FIG. 11 is a plan view of the packing station with its carton supply magazine removed.

FIG. 12 is a longitudinal vertical section through a packing station and the lower part of its carton magazine taken along line 12—12 of FIG. 11.

FIG. 13 shows the upper part of the magazine illustrated in FIG. 12.

FIG. 14 is a longitudinal vertical section through a packing station similar to FIG. 12, but taken along line 14—14 of FIG. 11 and viewed in a direction opposite to said FIG. 12.

2

FIG. 15 is a vertical section through a packing station taken along line 15—15 of FIG. 14.

FIG. 16 is another vertical section through a packing station taken along line 16—16 of FIG. 14 and viewed in a direction opposite to FIG. 15.

FIG. 17 is a fragmentary perspective of pusher or impeller members supported upon the carton feed conveyor of each packing station.

FIG. 18 is a fragmentary perspective illustrating the manner in which the feed conveyor of the packing station may be adjusted to handle either carton or cardboard grids.

FIGS. 19 and 20 are fragmentary vertical sections through the mechanism illustrated in FIG. 18, showing consecutive operational positions thereof.

FIG. 21 is a perspective diagram illustrating the electrical circuits of each packing station and the mechanical components controlled thereby.

FIG. 22 is a fragmentary exploded perspective of the switch control cams forming part of the circuit arrangement illustrated in FIG. 21.

FIG. 23 is a fragmentary perspective illustrating the control mechanism for the carton feed conveyor of each packing station.

FIG. 24 is a detail view illustrating mechanism associated wih the mechanical power train of each such carton feed conveyor.

FIG. 25 is a perspective of a battery of six egg release solenoids provided along the distributing conveyor at each of the eighteen packing stations.

FIG. 26 is a fragmentary transverse section taken along line 26—26 of FIG. 25.

FIG. 27 is a detail view illustrating part of the mechanism shown in FIG. 26 in a different operational position.

FIG. 28 is a fragmentary longitudinal section through the terminal run of the distributing conveyor taken along line 28—28 of FIG. 26.

FIGS. 29A, 29B, and 29C are schematic detail views showing consecutive operational positions of the mechanisms illustrated in FIG. 28.

FIGS. 30A, 30B, 30C and 30D are schematic sections through a packing station similar to FIG. 12 illustrating consecutive operational phases of the packing station.

*General Lay-Out of the Machine*

Having first reference to FIGS. 1, 2 and 3, the embodiment of the invention illustrated in the accompanying drawings comprises six candling stations 150 individually identified by the reference numerals 151, 152, 153, 154, 155 and 156. Each of said stations is provided with a platform 157 upon which the candler receives cases or crates with eggs from an inclined roller conveyor 158. At every one of said stations, an operator examines the eggs for external appearance, views them against a torch 159 (FIG. 5) to determine their internal condition and places those found acceptable upon one of eight superposed racks or chutes 160, individually identified by the suffix letters a, b, c, d, e, f, g, and h, according to their individual quality while depositing eggs that are broken, excessively dirty or otherwise unfit for human consumption into cardboard containers (not shown) placed upon trays 162 that are supported in candelabrum fashion at the right end of the racks 160 as viewed in FIG. 5.

At each candling station the eight superposed racks or chutes 160 are arranged to deliver eggs deposited thereinto onto cups 164 upon the rising run 166 (FIG. 5) of an elevator 168, and whenever an egg passes from the end of a rack or chute 160 into a cup 164, it actuates mechanism that registers the quality of the egg as represented by the rack onto which it was deposited by the candler, upon a rotary control device 170 (FIG. 4A), termed the memory belt that operates within a cabinet indicated at 172 in FIG. 1. Said memory belt is divided into a multitude of consecutive horizontally extending strip-shaped sectors 175 (FIG. 4A), and every one of the cups 164 on the rising runs of the six elevators 168 comprised in the machine is represented by a sector 175 of the memory belt. The memory belt 170 turns in timed relation with the elevators 168, and when an egg passes from one of the eight racks 160 of a candling station onto a cup 164 of the particular elevator associated with said candling station, the hereinbefore mentioned registration mechanism sets an element supported upon the sector 175 of the memory belt that corresponds to the particular elevator cup, in a manner indicative of the quality as represented by the chute or rack from which the egg was delivered onto the cup.

Every one of the six elevators 168 is arranged to deliver the eggs it receives from its associated racks or chute 160 to a respective one of six weighing mechanisms collectively identified by the reference numeral 180 (FIG. 1) upon which the eggs are weighed and which is arranged to activate mechanism that registers the weight group to which a particular egg belongs in the same sector 175 of the memory belt that previously recorded the quality of said egg.

From the weighing mechanism of the six candling stations the eggs are delivered by means of a lowering mechanism (not shown) onto a common single file conveyor 185 that carries an endless sequence of egg retaining buckets, and which operates at six times the speed of the elevators 168 and is timed in such a manner relative to said elevators and the associated weighing and egg lowering mechanisms that its consecutive buckets may carry away all eggs supplied from the six elevators by the egg lowering mechanisms without danger that more than one egg may be deposited into one and the same bucket.

The conveyor 185 conducts the eggs through an oiling station 188 (FIG. 1) wherein eggs of selected quality and weight combinations are subjected to an oil spray under control from the memory belt 170 to preserve their freshness. Thereafter said conveyors 185 extends over eighteen consecutive packing stations 190 (FIGS. 1, 2, 3 and 6), each provided with a container supply magazine 191, and as it carries the eggs consecutively to said packing stations, it distributes eggs of the same preselected weight and quality combinations under control from the memory belt 170 at predetermined ones of said stations into suitable cardboard containers delivered by feed conveyors 192 (FIG. 8) from the magazines 191 into positions underneath the distributing conveyor, such that said containers will receive only eggs of the same preselected weight and quality group. After a cardboard container has been filled in the described manner with eggs of the same quality and weight group, it is discharged onto a take-off ramp 193 from where an attendant may transfer it onto a suitable take-off conveyor 194 or 195, depending on its size (FIGS. 6 and 7), while means enter into operation that deliver a fresh cardboard container from the magazine 191 into egg receiving position below the distributing conveyor 185.

The present invention is particularly concerned with the mechanisms, at the packing stations 190, that store cartons, dispense cartons from a magazine, and convey the cartons to the positions at which they receive eggs from the egg supply conveyor 185. The other mechanisms of the machine are described in the above-mentioned Mumma Patent No. 2,895,274 and reference should be had to that patent for a detailed description of the construction and operation of those mechanisms.

After carrying the eggs contained in its buckets 186 through the oiling station 188, the upper run of the distributing conveyor 185 leads over eighteen juxtaposed packing stations 190 as previously pointed out. Each of said packing stations comprises a magazine 191 adapted to hold a stack of superposed egg containers, and each of said stations is arranged to place containers from its respective magazine in succession into egg-receiving position below the upper run of the distributing conveyor such that eggs of predetermined quality and weight combination released from the buckets of the distributing conveyor under control from the memory belt may drop into successive pockets of said container; and after a row of pockets has been filled with eggs, means enter into operation that advance the container a limited distance so that its next pocket row moves into egg-receiving position below the distributing conveyor; and whenever all the successive pocket rows in a particular container have been filled with eggs, each packing station is arranged to eject the filled container onto a take-off ramp 193 and place a new container from the magazine with its leading pocket row into egg receiving position below the upper run of the distributing conveyor.

Having reference to FIGS. 7, 8, 11, 12, and 14, each of the packing stations 190 comprises a container feed conveyor 192 that leads from below the container magazine 191 to a point below the upper run 572 (FIG. 7) of the distributing conveyor 185. In the particular embodiment of the invention illustrated in the accompanying drawings, the feed conveyor 192 (FIG. 8) is formed by three horizontally disposed, parallel, transversely spaced rods 751a, 751b and 751c that are rigidly supported from the opposite ends 752 and 753 of an elongated rectangular base frame 754. Along said rods egg containers placed thereon are pushed by impellers 755 that are supported at equal intervals from two endless sprocket chains 756a and 756b. Said sprocket chains are trained about a pair of sprockets 757a, 757b and a pair of sprockets 758a, 758b mounted upon transverse shafts 759 and 760, respectively, that are rotatably supported in the side walls 762a and 762b of the base frame near the opposite ends thereof in such a manner that the upper runs of the chains extend parallel to and closely below the rods 751a and 751c, respectively, with the impellers supported therefrom protruding into operative container propelling position between, and above the level of, said rods. The hereinbefore mentioned container supply magazine 191 is mounter upon outwardly turned flanges 766a and 766b provided along the upper edges of the side walls 762a and 762b of frame 754, and is preferably of such construction that it may selectively be adjusted to hold and dispense either cartons 767 of the type providing two rows of six pockets each as illustrated in FIG. 9, or cardboard grids 768 which form six consecutive rows of each six pockets and which rest loosely upon base plates 769 as illustrated in FIG. 10. The latter type containers, when filled with eggs, are placed in superposed relation into crates or cases to pack large numbers of eggs for transportation to consumers. For the sake of simplicity they will hereinafter briefly be referred to as cardboard grids 770.

Having reference to FIGS. 8, 12, 13, and 14, each container magazine is formed by a pair of vertically disposed transversely spaced rear bars 774a and 774b that constitute the rear wall of the magazine and which are rigidly attached to and rise from the upper edge of a vertically positioned transversely extending mounting plate 776 that is bolted along its lateral edges to a pair of uprights 778a and 778b. Said uprights in turn are bolted to and rise from the outwardly turned flanges 766a and 766b of the side walls 762a and 762b of the previously mentioned base frame 754. Secured to the rear bars 774a and 774b at different vertical levels are upper and lower frame bars 780 and 782, respectively, of rectangular shape, to which are rigidly secured pairs of vertical side bars 784a, 786a and 784b, 786b, that form the side walls of the magazine. The front wall of the magazine is formed by a fourth pair of spaced vertical bars 788a and 788b which are supported in such a manner from the front bars 790 and 792 of frames 780 and 782, respectively, that they may selectively be moved from the position shown in full lines in FIGS. 12 and 13 wherein they define a magazine for two-row cartons 767 to the position shown in phantom lines in said FIGS. 12 and 13 wherein they define a magazine of a size adapted to hold the hereinbefore described six-row cardboard grids 770. For this purpose, transverse hinge rods 794 and 796 are rotatably supported in the side portions 798a, 798b and 800a, 800b of the frames 780 and 782, respectively, adjacent the front portions 790 and 792 thereof, and firmly mounted upon said hinge rods are pairs of laterally positioned arms 802a, 802b, and 804a, 804b that extend in a direction inwardly of the frames. Rigidly supported in the free ends of said arms are cross rods 806 and 808, respectively, that are rotatably received in the parallel legs 810a, 810b and 812a, 812b of U-shaped brackets 814 and 816, whose connecting bars 818 and 820 are rigidly secured to the front bars 788a and 788b, respectively, at different vertical levels spaced apart by the same vertical distance as the frames 780 and 782. Spring means 822 coiled around, and anchored in, the upper hinge rod 794 while bearing against the front bar 790 of the upper frame 780 urge the described supporting structure into its lower position which is shown in phantom lines in FIGS. 12 and 13 in a position wherein stop lugs 824a and 824b (FIG. 9) provided on the front bars 788a and 788b, respectively, bear against the hinge rods 794 and 796 and wherein said front bars define a magazine for the hereinbefore described cardboard grids 770. From this position said supporting structure may be raised on the hinge rods 794 and 796 into the position shown in full lines in FIGS. 12, 13 and 14 wherein the front bars 788a and 788b define a magazine of a size adapted to accommodate a stack of two-row cartons 767 and wherein a transversely extending spring bolt 826, slidably received in apertured lugs 828a and 828b provided on the front bars between the upper stop lugs 824a and 824b and the upper U-shaped bracket 814, slides over one of the side portions of the upper frame 780 and in this manner prevents the supporting structure from returning to its lower position under the force of gravity and under the urgency of the spring means 822.

Supported from the hereinbefore mentioned uprights 778a and 778b adjacent the lower ends of the rearwardly positioned side bars 784a and 784b are superposed pairs of fingers 830a, 830b and 832a, 832b that form a gate mechanism 833 which is adapted to retain a stack of cartons 767 in the magazine when said magazine is adjusted to its narrower position, and which may be operated to release cartons from said stack so that they drop individually onto the carton supply conveyor underneath. Said fingers 830a, 830b and 832a, 832b depend from pairs of superposed spindles 834a, 834b and 836a, 836b rotatably received within the uprights 778a and 778b and have inwardly turned tips 838a, 838b and 840a, 840b, respectively, that reach normally into the interior of the magazine at levels spaced vertically apart by a distance about equal to the depth of a carton so that a stack of cartons may settle within the magazine with the lower fingertips 838a and 838b engaging the wedge-shaped center groove 841 (FIG. 9) of the lowermost carton in the stack and the upper fingertips 840a and 840b engaging the wedge-shaped center groove of the second lowest carton in the stack. Means are provided in accordance with the invention that may be energized to briefly withdraw first the lower finger tips 838a and 838b from within the magazine so as to release the lowest carton from the magazine while all other cartons are retained within the magazine by the upper finger tips 840a and 840b, and then said upper finger tips so that upon delivery of the lowermost carton onto the conveyor underneath and return of the lower finger tips to their carton retaining position, the stack of cartons above the upper finger tips may drop onto the lower finger tips whereupon the upper finger tips return to engage below what is then the second lowest carton in the remaining stack. Having reference to FIGS. 15, 16 and 21, the hereinbefore described vertical mounting plate 776 carries on its outer face a solenoid 842 whose normally projected armature 844 is pivotally connected through a vertical link 846 with the end of an inwardly directed arm 848 that is firmly mounted upon the protruding rear end of the spindle 834b for the right lower finger 830b, which spindle 834b is rotatably supported in the upright 778b as previously described. An interponent 852 pivotally connects another upwardly directed arm 854 on the spindle 834b with the end of a downwardly directed arm 856 that is firmly mounted upon the rearwardly protruding end of the spindle 834a for the left lower finger 830a, which spindle is rotatably mounted in the upright 778a as previously described. Upon energization of the solenoid 842 retraction of its armature 844 swings the spindle 834b of the right lower finger 830b in a counterclockwise direction, as viewed in FIGS. 15 and 21, and in this manner swings the right lower finger tip out of the magazine. The defined rotation of spindle 834b is effective through the interponent 852 to turn the spindle 834a of the left lower finger in clockwise direction, as viewed in FIGS. 15 and 21, which swings the left lower finger tip out of the magazine. Upon de-energization of the solenoid 842 a spring 858 tensioned between a stud 860 projecting from the mounting plate 776 and the interponent 852 returns both fingers 830a and 830b immediately to their inwardly projected carton retaining position.

To operate the upper fingers 832a and 832b the mounting plate 776 carries another solenoid 862 whose normally upwardly projected armature 864 is pivotally connected through a link 866 to an inwardly directed arm 868 that is firmly mounted upon the rearwardly protruding end of the spindle 836a which carries the left upper finger 832a and which is rotatably mounted in the upright 778a as previously explained. A downwardly directed second arm 872 on the spindle 836a is pivotally connected through an interponent 874 with the end of an upwardly directed arm 876 that is firmly mounted upon the spindle 836b which carries the right upper finger 832b and which is rotatably mounted in the upright 778b as previously described. Energization of the solenoid 862 is, therefore, effective to withdraw the tips of both the upper fingers 832a and 832b from the interior of the magazine in the same manner in which energization of the solenoid 842 is effective to retract both the lower fingers from the magazine, and upon de-energization of the solenoid 862 a spring 878 tensioned between a stud 880 projecting from the mounting plate 776 and a suitable point of the interponent 874 returns both the upper fingers 832a and 832b immediately to their inwardly projected carton retaining position.

Appropriate energization of the two solenoids 842 and 862 to operate the upper and lower carton retaining fingers in the proper sequence and at the proper time in the operation of the machine is controlled, in a manner to be more fully described hereinafter, by a cam disk 882 (FIG. 22) that is firmly mounted upon the hereinbefore described transverse shaft 759 of the carton supply conveyor.

Whenever the magazine is adjusted to handle the hereinbefore described cardboard grids 770, the retaining fingers 830a, 830b and 832a, 832b are permanently disabled by suitable manipulation of a switch mechanism 884 (FIG. 21) to maintain both the solenoids 842 and 862 in a constant state of energization where they keep said fingers permanently withdrawn from the magazine. Manipulation of said switch mechanism 884 is also arranged to return to operative position another gate mechanism 886 at the bottom of the magazine which is adapted to retain the cardboard grids 770 within the magazine and which may be operated to release a base plate 769 with its appertaining cardboard grid 768 individually for delivery onto the feed conveyor underneath. Said gate mechanism 886 is in permanently disabled condition as long as the magazine is adjusted to handle the two-row egg cartons as previously described and it embodies the same principles as the above described carton retaining mechanism with its upper and lower pair of retaining fingers. Accordingly, it comprises a pair of upper inwardly turned retaining flanges 888a and 888b that correspond to the tips of the upper fingers of gate mechanism 833 and which are formed at the lower ends of plates 890a and 890b, respectively. Said plates are firmly mounted along their upper edges on horizontal spindles 892a and 892b which are pivotally supported in and between the hereinbefore described uprights 778a, 778b and another pair of uprights 894a, 894b that rise from the hereinbefore described flanges 766a and 766b of the base frame at points in front of the side bars 786a and 786b, respectively, of the magazine (FIGS. 8, 15, and 16). Likewise supported for rotation from and between the mentioned uprights 778a, 893a and 778b, 894b, respectively, is another pair of spindles 896a and 896b, each carrying rigidly secured to their front and rear ends depending arms 898a, 900a and 898b, 900b, respectively, and rigidly secured to the lower ends of said arms below the level of the inwardly turned flanges of the plates 890a and 890b are angle bars 902a and 902b having inwardly turned substantially horizontal flanges 904a and 904b that correspond to the tips of the lower fingers of gate mechanism 833. Secured to the rearwardly protruding end of the left lower spindle 896a is a downwardly directed arm 906 whose free end is pivotally connected through an interponent 908 to an upwardly directed arm 910 that is firmly mounted upon the right lower spindle 896b. Likewise mounted upon said spindle is an inwardly directed arm 914 which is pivotally connected by means of a link 916 to the normally upwardly projected vertically disposed armature 918 of a solenoid 920 that is supported from the repeatedly mentioned mounting plate 776. The rearwardly projecting end of the right upper spindle 892b carries firmly secured thereto an upwardly directed arm 922 which is pivotally connected through an interponent 924 to a downwardly directed arm 926 that is firmly mounted upon the rearwardly protruding end of the left upper spindle 892a. Likewise mounted upon said spindle 892a is an inwardly directed arm 930 which is pivotally connected through a vertically disposed link 932 to the upwardly projected armature 934 of yet another solenoid 936 that is supported from the mounting plate 776. When the magazine is adjusted to a position wherein it handles cardboard grids 770, both the superposed pairs of flanges 888a, 888b and 904a, 904b are projected into the interior of the magazine under the urgency of springs 938 and 940, respectively, that are tensioned between the interponents 924 and 908 and appropriate studs 942 and 944 projecting rearwardly from the mounting plate 776. When said flanges 888a, 888b and 904a, 904b are in said inwardly projected position, the lower pair of flanges 904a, 904b supports the lowermost base plate in the magazine, while the upper pair of flanges 888a, 888b protrudes into the stack of superposed cardboard grids below the second lowest base plate in the stack. In order that the upper pair of flanges 888a and 888b may dependably move in below the second lowest base plate 769 in the stack, the vertical distance between the upper and lower retaining flanges in the position illustrated in FIG. 16 is arranged to be slightly less than the total depth of a base plate with a cardboard grid resting thereon, and in order that the upper set of retaining flanges 888a and 888b may close in below the second lowest base plate in the stack without crushing the lowest cardboard grid 768 in the stack, the inner edges of said flanges are provided with recesses 946 corresponding to the projecting ends 947 of the transverse walls of the cardboard grids (FIG. 10) so that only the tongues 948 formed between adjacent recesess 946 in the edges of the upper flanges 888a and 888b move in below the second lowest base plate in the stack. When a cardboard grid is to be released from the magazine the solenoid 920 of the lower set of retaining flanges 904a and 904b is first energized retracting its armature 918 for a brief period of time to withdraw said lower retaining flanges from the magazine. This causes the lowest base plate with its cardboard grid resting thereon to drop upon the supply conveyor underneath, while the upper retaining flanges 888a and 888b prevent the remaining supply of base plates and cardboard grids in the magazine from following suit. As the lower set of carton retaining flanges returns to its inwardly projected position under the urgency of spring 940 upon de-energization of solenoid 920, the solenoid 936 is briefly energized causing withdrawal of the upper carton retaining flanges 888a and 888b which permits the remaining stack of superposed cardboard grids within the magazine to drop onto the lower set of retaining flanges 904a and 904b; and upon de-energization of the last-named solenoid 936 the upper set of carton retaining flanges 888a and 888b closes in and moves with its tongues 948 below the second lowest base plate within the magazine so that the mechanism is again in its initial position wherein it is ready for another operational cycle.

In order that the second lowest base plate with its cardboard grid resting thereon be properly centered with regard to the magazine so that it may, upon withdrawal of the upper retaining flanges, drop freely upon the lower set of retaining flanges during the brief moment before said upper flanges return to their inwardly projected positions, said last mentioned flanges 888a and 888b carry longitudinally extending centering ledges 950a and 950b, as shown in FIG. 16.

The exact moment and the proper sequence in the operation of the solenoids 920 and 936 is determined by the same cam disc 882, on the supply conveyor shaft 759 that controls the operation of the actuating solenoids for the two superposed pairs of carton retaining fingers, as will be described in greater detail hereinafter.

Each of the hereinbefore mentioned impellers 755 of the carton supply conveyor is formed by pairs of channel sections 954a and 954b that are firmly mounted in juxtaposed relation at either side of the central carton supporting rod 751b upon a common horizontally disposed tubular rod 956 (FIG. 17). Said rod is rotatably supported by means of pivot studs 958 projecting inwardly from transversely aligned links 960a and 960b of the conveyor chains (FIGS. 15 and 16). As the impellers 755 travel along the upper run of the conveyor chains, they are positively moved into, and thereafter maintained in, a rotary position upon the pivot studs 958 wherein their leading face 962 extends first in a steeply slanting and thereafter in a substantially vertical plane as shown in FIGS. 12 and and 14. For this purpose the tubular rod 956 of each impeller 755 carries firmly mounted upon one of its ends a rearwardly directed arm 964 provided with a roller 966 and as an impeller swings around the rear sprockets 757a and 757b of the conveyor chains, the roller 966 on its arm 964 engages first the outer edge of a circular camming disc 968 mounted upon the rear shaft 759 of the conveyor and then the upper edge 970 of a bar-shaped camming ledge 972 that is suitably supported from the adjacent side wall 762 of the base frame 754. The periphery of disk 968 and the initial portion of edge 970 are of such a level as to hold the impellers in the rearwardly inclined position illustrated at 974 in FIGS. 30A, 30B, 30C and 30D wherein they funnel a carton or cardboard grid dropped from the magazine onto the guide rods 751a, 751b and 751c into the space in front of the impellers. However, directly below the magazine the camming edge 970 forms a gentle rise 976 that is effective to swing the impellers from said rearwardly inclined positions into the upright position shown at 978 in FIGS. 12 and 30A to 30D wherein their leading faces 962 lie practically in a vertical plane and press fully against the rear wall of a carton or cardboard grid deposited in front of them.

In order that the control arm 964 may always trail behind its respective impeller and its roller 966 may therefore be properly engaged by the camming disc 968 as an impeller approaches, and rises behind, said disc on the return run of the conveyor, the rotation of the tubular mounting rods 956 of the impellers upon their pivot studs 958 is limited to a relatively narrow arc. For this purpose the opposite end of each mounting rod 956 is provided with a disc 980 (FIGS. 17 and 26) having a cut-out sector 982 whose side edges embrace a stud 984 that is supported on and projects inwardly from the directly preceding chain link 960a. Accordingly, rotation of each tubular mounting rod 956 on its pivot studs 958 is limited to the arc of the cut-out sector 982 of disc 980.

The lower portion 986 of the trailing face 988 of each impeller 755 is arranged to extend parallel to its leading face 962, and all the impellers on the conveyor are spaced apart longitudinally of the conveyor by such a distance that the pockets 985 formed between the trailing face of a preceding impeller and the leading face of a succeeding impeller will snugly receive a cardboard grid 770. To facilitate the introduction of a cardboard grid dropped from the magazine into the pockets thus formed, the upper portion 990 of the trailing face 988 of each impeller is preferably inclined as shown in FIGS. 17 and 26.

Means are provided in accordance with the invention to appropriately shorten the pockets formed between successive impellers whenever a packing station is adjusted to handle cartons of the two-row type, such as illustrated in FIG. 9. For this purpose, the chains 756a and 756b of the carton supply conveyor carry intermediately each two consecutive impellers 755 a carton retaining member 992 that is normally dropped below the surface of the guide rods 751a, 751b and 751c whenever the packing station is employed to handle cardboard grids, and which may be raised into effective carton retaining position above the level of said guide rods when the packing station is to handle two-row cartons.

Having reference to FIGS. 18 and 26, each retaining member is formed by a pair of channel sections 994a that are firmly mounted in juxtaposed realtion at either side of the central carton supporting rod 751b (FIG. 16) upon a common horizontally disposed tubular rod 996 (FIG. 18). Said rod 996 in turn is rotatably supported upon pivot studs 958 (FIG. 26), that project inwardly from transversely aligned links 960a and 960b (FIG. 15) of the conveyor chains 756a and 756b (FIG. 11). When traveling along the upper run of the supply conveyor, said channel sections 994a and 994b drop normally below the level of the guide rods 751a, 751b and 751c under their own weight to an extent limited by the width of a recess 998 provided in the outer edge 1000 of a forked stop member 1002 that is firmly mounted upon the tubular mounting rod 996 of each retaining member 992 and which comes with its upper rotation limiting finger 1004 against a stop stud 1005 that projects inwardly from a trailing link 960a of the adjacent conveyor chain 756a, as illustrated in FIG. 18. To raise the retaining members 992 from their ineffective position to a position above the guide rods 751a, 751b and 751c so as to define pockets 1006, on the conveyor, of a size adapted to receive and retain two-row cartons of the type illustrated in FIG. 9, a camming ledge 1008 extending lengthwise of the conveyor below the upper run of its chain 756a (FIG. 14) and adjacent the frame side wall 762a is swung from the laterally inclined position shown in FIG. 18 to the vertically disposed upright position shown in FIGS. 15 and 20 wherein its upper edge engages a roller 1010 that is pivotally supported from a rib 1012 which is secured to the under side of the channel segment 994a at the outer edge thereof. Said camming ledge 1008 is firmly secured to two arms 1014 and 1016 that turn on a horizontal shaft 1018 which extends longitudinally of, and is suitably supported from, the side walls 762a of the base frame 754 (FIGS. 18, 19, 20 and 26). The arm 1014 is part of a bell crank 1020 (FIG. 18) whose other arm 1022 extends through a vertical slot 1024 in the side wall 762a and carries pivotally mounted upon its outwardly projecting end an actuating stem 1026. Said stem extends upwardly through a slot 1028 provided in the outwardly turned upper flange 766a of said side wall 762a and carries at its upper end an actuating disc or button 1030. To limit the downward rotation of the camming ledge 1008 upon the horizontal shaft 1018, the actuating stem 1026 forms an outwardly projecting stop shoulder 1032 near its lower end whose upper edge is of greater width than the slot 1028. Said shoulder, therefore, comes against the lower face of the flange 766a when the camming ledge 1008 drops under its weight in clockwise direction as viewed in FIGS. 18, 19 and 20, and in this manner limits positively the downward movement of said camming ledge.

Above the stop shoulder 1032 the actuating stem 1026 forms an outwardly slanting camming edge 1034 that ends a limited distance below the actuating disc 1030 in an abruptly receding latching shoulder 1036 which is of lesser width than the slot 1028 in flange 766a. When it is desired to move the retaining members 992 on the upper run of the carton supply conveyor into their effective pocket forming positions so that the conveyor may properly handle two-row cartons of the type illustrated in FIG. 9, the operator depresses the button 1030 until the latching shoulder 1036 drops through and below the slot 1028 in flange 766a. Thereupon he swings the stem 1026 outwardly upon its pivotal connection with the arm 1022 of the bell crank 1020 so that upon release of the operating button 1030 the latching shoulder 1036 may engage underneath the outer edge portion of the flange 766a and maintain the stem 1026 in its depressed position with the camming ledge 1008 raised into effective condition against the opposing weight of said camming ledge. To yieldably retain the stem in its depressed and outwardly inclined position, a spring 1038 may be coiled around the upper end of the stem 1026 between the operating button 1030 and an apertured disc 1040 that is engaged over the upper stem end and which bears normally against the latching shoulder 1036.

When the stem 1026 is depressed in the above described manner, the bell crank 1020 swings in counterclockwise direction, as viewed in FIGS. 18 and 19, which brings the upper edge of the camming ledge 1008 at first against a plurality of downwardly slanting camming edges 1042 formed by the ribs 1012 from which the rollers 1010 of the various retaining members 992 are supported. This is effective to raise the retaining members on the upper run of the conveyor 192 gradually in clockwise direction as viewed in FIGS. 18 and 26 until the camming ledge is in the vertical position illustrated in FIGS. 15 and 20 wherein its upper edge is engaged by the rollers 1010. With said rollers thus engaged, all the retaining members 992 of the carton supply conveyor 192 are swung into effective position, as they move onto the upper horizontal run of the conveyor, and are maintained in said position over the total length of said run (FIGS. 12 and 14). When in said effective position they present a substantially vertical surface 1044 formed by their trailing walls to the leading surface 962 of the directly succeeding impellers 755 on the conveyor and the distance between said vertcial surfaces on the trailing walls of the retaining members in effective position and the leading walls of the directly succeeding impellers is arranged to be of the proper size to snugly receive and retain a two-row carton, as illustrated in FIG. 26.

The prevent that cartons or cardboard grids may accidentally leap from the pockets 985 and 1006 formed between consecutive impellers or consecutive impellers and retaining members, respectively, when the former propel them along the guide rods 751a, 751b and 751c, the leading face of each impeller section may form a transverse recess 1046 along its upper end, and mounted within said recesses for rotation about an eccentric axis are cylindrical sleeves 1048 whose outer surfaces are preferably coated with a suitable plastic 1050 as best shown in FIG. 26. The cylindrical sleeves 1048 of both impeller sections are engaged over and rigidly secured along their inner surfaces to transverse spindles 1052 that are rotatably mounted in bearings 1054a and 1054b which are held in the upper ends of the impeller sections, as best shown in FIG. 17, the arrangement being such that the upper end of the trailing wall 988 of each impeller section positively holds the sleeves 1048 upon spindles 1052 in a rotary position wherein they protrude only very slightly beyond the front surface 962 of the impeller, as shown in FIG. 26. Hence a carton or cardboard grid dropped into the pocket in front of the impeller may readily slide with its rear wall downwardly past the protruding segments of the cylindrical sleeves 1048, but when the direction of movement of the carton or cardboard grid is reversed, its frictional engagement with the surfaces of the sleeves 1048 will tend to turn said sleeves upon the spindles 1052 in counterclockwise direction, as viewed in FIG. 26, which projects the sleeves further beyond the leading face of the impeller sections and in this manner blocks upward movement of the carton or cardboard grid. For the same purpose, a strip 1056 of plastic material may be provided along the upper end of the vertical face 1044 formed by the trailing wall of each retaining member 992, as likewise shown in FIG. 26.

During practical performance of the described packing stations, the conveyor chains 756a and 756b are intermittently at rest with one of the impellers 755 on their upper runs initially in a position substantially in vertical alignment with the rear bars 774a and 774b of the carton magazine 191 (FIG. 30A). When in the defined position the leading surface 962 of said impeller is somewhat rearwardly inclined owing to engagement of its roller 966 with the lower portion of the camming ledge 972, as previously explained and as illustrated in FIG. 30B, so that the leading surface of the impeller aids in guiding a carton or cardboard grid dropped from the magazine into its proper position within the pocket formed between said impeller and the preceding impeller or retaining member, as the case may be. After a carton or cardboard grid has been dropped from the magazine onto the guide rods 751a, 751b and 751c into the pocket formed in front of the impeller, and provided the last pocket row of the carton or cardboard grid engaged by the preceding impeller member has been completely filled with eggs from the distributing conveyor 185, means enter into operation that advance the conveyor chains with their upper runs moving in a direction toward the distributing conveyor over a distance appropriate to move the newly received carton or cardboard grid with its leading pocket row into vertical alignment with the distributing conveyor, while pushing the carton or cardboard grid propelled by the preceding impeller beyond the range of the distributing conveyor (FIGS. 30C and 30D). Then after the first pocket row of the carton or cardboard grid has been filled with eggs from the distributing conveyor, the conveyor chains advance again by a distance appropriate to place the next succeeding row of pockets of the carton or cardboard grid underneath the distributing conveyor. In the event that the packing station is adjusted to handle cardboard grids of the type having six successive pockets rows, as illustrated in FIG. 10, this process repeats itself five times. In any event, whenever an impeller 755 is about to move the final row of a carton or cardboard grid into alignment with the distributing conveyor, the appropriate magazine gate mechanism 833 or 886, as the case may be, is actuated to drop a carton or cardboard grid respectively in front of the directly succeeding impeller member 755, which at this moment is vertically aligned with the rear bars of the magazine (FIG. 30B), and after the last pocket row of the initially discussed carton or cardboard grid has been filled with eggs (FIG. 30C) the conveyor chains advance again to move said first-mentioned carton or cardboard grid beyond the range of the distributing conveyor while placing the newly received container with its leading pocket row into egg receiving position below the distributing conveyor (FIG. 30D).

To operate the conveyor chains in the described manner, a sprocket chain 1058 (FIG. 4B) applies the rotary power of a continuously turning electric motor 1060 to a sprocket 1062 that is mounted upon a shaft 1064 extending below the base frames of the various packing stations comprised in the machine of the invention, in a direction parallel to the terminal run of the distributing conveyor. Said shaft carries firmly mounted thereon a number of sprockets 1066, one for each of the packing stations comprised in the machine, and each of said sprockets 1066 is operatively connected by an endless sprocket chain 1068 with a sprocket 1070 (FIG. 8) that is firmly mounted upon a shaft section 1072 which is rotatably supported in the side wall 762a of the base frame 754 of a packing station at a point intermediately of its conveyor shafts 759 and 760 and between the upper and lower runs of the conveyor chains 756a and 756b (FIGS. 11 and 12). Within the base frame 754 the shaft section 1072 carries the drive disc 1074 of a friction clutch 1076 of suitable design. The driven discs 1078 of said clutch are keyed upon an axially aligned shaft section 1080 that is rotatably supported from the opposite side wall 762b of the base frame. Mounted upon said last-mentioned shaft section is a sprocket 1082 which is operatively connected by an endless sprocket chain 1086 with another sprocket 1088 that is firmly mounted upon the shaft 760 which carries the drive sprockets 758a and 758b of the conveyor chains 756a and 756b.

During practical performance of the packing station, the driven discs 1078 of the friction clutch 1076 are yieldably urged into operative engagement with the drive disc 1074 by suitable spring means indicated at 1090 in FIG. 11. Rotation of the driven shaft section 1080, however, is effectively prevented by engagement of a latching pawl 1092 with one of the teeth formed in the edge of a locking ratchet 1094 that is firmly mounted upon the driven shaft section, so that the conveyor chains remain at a standstill in spite of the continuous rotation of motor 1060. The latching pawl 1092 turns on a stud 1096 projecting laterally from a vertically positioned mounting shelf 1098 which is rigidly supported from the side wall 762b of the base frame 754 (FIG. 23). The nose 1100 of the latching pawl 1092 is yieldably held in ratchet locking position by a stud 1102 that slides within a cylindrical sleeve 1104 secured to a mounting plate 1106 and which is projected from said sleeve and against the upper edge of the tail 1108 of the latch pawl by a coil spring 1110 disposed within the sleeve 1104 above the stud 1102. To withdraw the nose of the latch pawl from the ratchet whenever it is necessary to operate the conveyor chains and advance a carton or cardboard grid for the purpose described hereinbefore, the tail 1108 of the latch pawl is pivotally connected at its end by means of a short interponent 1112 to the downwardly projected armature 1114 of a solenoid 1116 that is supported from a suitable bracket 1118 which in turn is bolted to the hereinbefore mentioned mounted plate 1106. Whenever a carton or cardboard grid is to advance to present a new row of egg receiving pockets to the distributing conveyor, the solenoid 1116 is energized under control from a secondary memory mechanism that is associated with and controlled by the hereinbefore mentioned memory belt in a manner to be described in greater detail hereinafter, and as it retracts its armature 1114, the latch pawl 1092 is swung in counterclockwise direction, as viewed in FIG. 23, against the urgency of the spring stud 1102 and withdraws its nose 1100 from whatever tooth in the edge of the ratchet it engaged. As a result thereof, the friction clutch 1076 is capable of transmitting the rotary power of shaft section 1072 through shaft section 1080 to the conveyor chains, and said chains advance by a distance determined by the length of the time during which the solenoid 1116 remains energized and by the length of the back, respectively, of whatever tooth was previously engaged by the ratchet nose.

The edge of ratchet 1094 forms six consecutive teeth 1121, 1122, 1123, 1124, 1125, and 1126. Five of these teeth, namely 1122, 1123, 1124, 1125 and 1126 have backs of equal angular width corresponding to the intermittent advances of the conveyor that are necessary to place the second, third, fourth, fifth, and sixth pocket rows of a cardboard grid into egg receiving position below the distributing conveyor, while the remaining tooth 1121 has a back of substantially larger angular width to advance a succeeding cardboard grid into a position wherein its first row is in alignment with the distributing conveyor. The arrangement is such that when the last short tooth 1126 is engaged by the latching pawl 1092, one of the impellers 755 holds the penultimate row of pockets of a cardboard grid or carton below the distributing conveyor and the succeeding impeller 755 is aligned with the rear bars of the magazine so that the pocket formed directly ahead of said impeller is in a position to receive a carton or cardboard grid from the magazine (FIG. 30B). Then, after said pocket has received a cardboard grid, assuming that the magazine has been adjusted to handle cardboard grids, and after the fifth row of a preceding cardboard grid has been filled with eggs from the distributing conveyor, the mentioned secondary memory mechanism causes energization of the solenoid 1116, effecting withdrawal of the latch 1092 from behind the ratchet tooth 1126. As a result thereof, the shaft section 1080 may turn and advance the carton supply conveyor until the nose 1100 of the latch pawl 1092 returns to the back of tooth 1126 upon de-energization of the solenoid 1116 and comes against the succeeding tooth 1121 which brings the conveyor to an abrupt halt with the last pocket row of the cardboard grid aligned vertically below the distributing conveyor (FIG. 30C). Then after said last pocket row of the cardboard grid has been filled with eggs, the secondary memory mechanism causes again energization of the solenoid 1116, effecting withdrawal of the latch 1092 from behind the long-backed ratchet tooth 1121. As a result thereof, the carton supply conveyor may now advance a longer distance, which places the leading pocket row of the succeeding cardboard grid in vertical alignment below the distributing conveyor (FIG. 30D). After said leading pocket row has been filled with eggs, the solenoid 1116 is again briefly re-energized causing withdrawal of the pawl nose from behind the ratchet tooth 1122 which permits the conveyor to advance again over a shorter distance which places the second row of pockets of the second cardboard grid into vertical alignment with the distributing conveyor. This process repeats itself every time a row of pockets is filled with eggs until the last of the pocket rows of the cardboard grid comes to lie below the distributing conveyor, when the latch pawl 1092 engages again the first ratchet tooth 1121 that is distinguished by its elongated back. By this time another cardboard grid with its base plate has dropped into the pocket formed in front of the succeeding impeller, marking commencement of another cycle in the operation of the carton feed mechanism.

The operation of the carton feed mechanism is analogous when the packing station is adjusted to handle two-row cartons, with the difference that after delivery of a carton into a pocket 1006 formed between an impeller and a directly preceding retaining member in raised condition, and after the last pocket row of a preceding carton has been filled with eggs from the distributing conveyor, the solenoid 1116 is energized in a manner to be described in greater detail hereinafter for a longer period of time such that the nose of the latch pawl 1092 remains withdrawn from the edge of the ratchet 1094 until, not only the tooth 1121 with its elongated back, but also the four directly succeeding teeth, 1122, 1123, 1124 and 1125 have passed the pawl so that said pawl engages the sixth tooth 1126. This permits the conveyor to advance until the first pocket row of the second carton—which corresponds to the fifth pocket row of a cardboard grid—lies below the distributing conveyor, and moves the next succeeding conveyor pocket 1006 below the magazine to receive a third carton. Then after the first pocket row of the second carton has been filled with eggs from the distributing conveyor under control from the secondary memory mechanism, said mechanism causes brief energization of the solenoid 1116 to withdraw the latch pawl 1092 from the sixth ratchet tooth 1126 and causes re-engagement of said pawl with the first tooth 1121 which places the last pocket row of the second carton underneath the distributing conveyor. Then after said last row of the second carton has been filled with eggs, the solenoid 1116 is again energized for a longer period of time to move the third carton with its leading pocket row into vertical alignment with and below the distributing conveyor while discharging the filled carton onto the take-off ramp 193 as previously described.

Any slack in the pulling run of the endless sprocket chain 1086 that transmits the rotary power of shaft section 1080 to the sprocket 1088 upon the drive shaft 760 of the conveyor chains might cause said chains to encounter the load of the conveyor mechanism with excessive abruptness when the latch pawl 1092 disengages the control ratchet 1094 and permits the shaft section 1080 to be driven from the motor 1060 through the friction clutch 1076. This would not only place an excessive strain upon the sprocket chain 1086 that may severely shorten its life-time, but might also start the conveyor with such abruptness that eggs in cartons or cardboard grids upon the conveyor might come to harm. Means are, therefore, provided in accordance with the invention that are effective to compensate automatically for any difference in slack between the pulling run and the pulled run of the power transmitting sprocket chain 1086. Having reference to FIGS. 12 and 24, both runs of the chain 1086 are engaged by shoes in the form of semi-circular segments 1128 and 1130, respectively, that are pivotally mounted upon the upper and lower ends of a vertical connecting bar 1132 at such a distance from each other that their confronting arcuate guide surfaces maintain the endless sprocket chain 1086 at all times in properly tensioned condition. At its lower end the bar 1132 is pivoted to the end of an arm 1134 whose opposite end is pivotally supported at a level intermediately the upper and lower runs of the sprocket chain 1086 from a block 1136 that is rigidly secured to the side wall 762b of the base frame 754 (FIG. 11). At a point 1138 intermediate its ends the arm 1134 is pivotally connected to the downwardly projecting stem end 1140 of a plunger 1142 that forms part of a dash pot 1144 which in turn is pivotally supported from the side wall 762b of the base frame 754. When disengagement of the latching pawl 1092 from the ratchet 1094 releases the shaft section 1080 for sudden rotation in counterclockwise direction, as viewed in FIG. 12, the sudden pull exerted upon the lower run of the sprocket chain 1086 would normally straighten the chain, if it were in slack condition, and would then abruptly apply the full force of the rotating sprocket 1082 on shaft section 1080 to the sprocket 1088 on the conveyor drive shaft 760. Due to the described arrangement however, straightening of the lower run of the chain 1086 is opposed by the dash pot 1144 because the liquid within said dash pot below its plunger 1142 opposes the lowering of the arm 1134 from which the lower guide segment 1130 is supported. The rotary power of sprocket 1082 is, therefore, applied to the sprocket 1088 as gradually as it is developed, with practically the full load of the conveyor to be driven imposed thereon from the very start, and both sprockets will, therefore, commence rotation substantially in unison. On the other hand, when the lock pawl 1092 re-engages the control ratchet 1094, and rotation of the shaft section 1080 and the sprocket 1082 mounted thereon comes to a sudden halt, the described arrangement prevents the conveyor from coming to a halt with such abruptness as would occur if the upper or pulled run of the sprocket chain 1086 were allowed to straighten out immediately under the inertia of the movable components of the conveyor. Due to the presence of the described arrangement, the necessary upward movement of arm 1134 from which the upper guide disc 1128 is supported, is opposed by the liquid in the dash pot 1144 above the plunger 1142 which liquid may only seep gradually back into the space below the plunger. Hence, the upper run of the chain 1086 can only straighten out gradually under the force of the inertia of the movable conveyor components, and the conveyor may, therefore, continue to move over a very limited distance before it comes to a final halt and as the upper run of the sprocket chain 1086 straightens out against the retarding force of the dash pot, the concomitant upward movement of arm 1134 raises the lower run of the sprocket chain by means of the lower guide segment 1130 and in this manner prevents development of any harmful slack on the pulling run of the sprocket chain so that upon renewed disengagement of the locking pawl 1092 from the control ratchet 1094, the advance of the carton supply conveyor may again commence without undue abruptness.

When the feed conveyor 192 of a particular packing station has placed a carton or cardboard grid with one of its pocket rows directly below the upper run of the distributing conveyor, six solenoids 680 (FIG. 25) in the battery of solenoids associated with each packing station adjacent said conveyor run, are operated in succession under control from the repeatedly mentioned secondary memory device, commencing with the solenoid on the downstream end of the battery, to open whatever bucket 186, passing by on the distributing conveyor, contains an egg of the selected quality and weight combination to be packed in the carton or cardboard grid underneath. The six solenoids 680 of each of the batteries 678 are secured to the horizontal flange 1150 (FIG. 25) of an L-shaped channel 1151 that is rigidly supported from the machine frame by a plurality of legs 1153.

Each of the solenoids 680 comprise a coil 1154 (FIG. 26) with its axis disposed horizontally and extending in a direction parallel to the carton supply conveyor 192 and transversely to the distributing conveyor 185, and each of said coils is wound around the center bar of a U-shaped iron core 1155 whose parallel shanks 1156a and 1156b extend upwardly and form inclined top surfaces 1157a and 1157b that slant downwardly away from the distributing conveyor. Pivotally supported from the roof 1158 of a shell structure 1160 (FIG. 25) that surrounds each solenoid, by means of a pair of links 1161a and 1161b, is a bar-shaped armature 1162 (FIG. 26) that is bent to form two inclined surfaces 1163a and 1163b disposed in cooperative relationship above, and parallel to, the inclined top surfaces 1157a and 1157b of the core shanks 1156a and 1156b, respectively. The front end 1165 of each armature 1162 extends in a direction toward and above the adjacent chain of the distributing conveyor 185 and carries on its underside the previously mentioned actuating ledge 687. A spring 1166 tensioned between a stud 1167 on the top surface of the armature 1162 and a suitable point 1168 at the ceiling 1158 of the shell structure 1160 withdraws the armature normally in a rearward direction from the shanks of the core 1155 to an extent determined by contact of the rear link 1161b with a stop ear 1170 depending from the ceiling 1158 of the shell structure 1160 at the rear end thereof and in this manner yieldably holds the armature 1162 with its inclined surfaces 1163a and 1163b in spaced relation to the inclined top surfaces 1157a and 1157b of the core shanks. In this position its actuating ledge 687 is withdrawn from the path of the actuating noses 675 formed on the leading gear segments 673 that are associated with each bucket 186 of the distributing conveyor 185 as previously described, and the pivotal connections 1171a and 1171b of the lower ends of the links 1161a and 1161b with the movable armature 1162 have passed the lowest points of their orbits and are located rearwardly of the vertical planes determined by the center axes of the pivotal connections 1172a and 1172b of their upper ends with the stationary roof 1158 of the shell structure 1160 as illustrated in FIG. 26. Upon energization of a solenoid 680, however, the core 1155 attracts the armature 1162 against the urgency of the spring 1166 swinging its forwardly with the links 1161a and 1161b passing through their lowest positions, to an extent determined by engagement of a stop lug 1173 secured to the tail end of said armature with the outer face of the rear shank 1156b of the core as shown in FIG. 27. In this position the pivotal connections 1171a and 1171b at the lower ends of the links 1161a and 1161b have moved forwardly of the vertical planes determined by their pivotal connections 1172a and 1172b with the roof of the shell structure 1160 which planes determine their lowermost positions, and the ledge 687 at the front end of the armature 1162 is projected into the path of the noses 675 formed on the leading gear segments 673 of the conveyor buckets 186 as illustrated at 1175 in FIG. 25. As a result thereof, the actuating nose 675 of the bucket approaching the projected ledge 687 at the moment comes against said ledge 687 and is cammed backwards as likewise illustrated at 1175 in FIG. 25, which is effective to open the bucket causing it to drop its egg into a carton pocket or cardboard grid pocket underneath, as illustrated in FIG. 28.

Due to the position of the supporting pivots 1171a and 1171b of the armature 1162 forwardly of and above the lowest points of their actuating orbits and due to the fact that the actuating noses of the conveyor buckets are arranged to engage the projected camming ledges from below, said camming ledges once engaged by an actuating nose are unable to return to their retracted positions until said nose has passed them completely. As a result thereof any bucket whose nose has come in operative contact with a projected ledge is opened completely and remains dependably open for a sufficient period of time to safely discharge its egg, even if the operating solenoid of the actuating ledge should prematurely become de-energized.

Since the distributing conveyor 185 is continuously in motion and moves relatively fast, an egg released from a bucket 186 by energization of one of the solenoids 680 in the hereinbefore described manner does not drop from the bucket in a straight line but forms a parabolic trajectory as indicated at 1177 in FIG. 28. The position of the actuating ledges 687 relative to the carton, or cardboard grid, supporting conveyors 192 is, therefore, such that they engage the leading gear segments 673 of the buckets before the buckets reach a position in vertical alignment with the pockets presented to them by the cartons or cardboard grids on the conveyor underneath, as illustrated in FIG. 29A. Hence the trajectory of an egg dropped from an advancing bucket will lead it directly into its proper pocket, as illustrated in FIGS. 29B and 29C.

To reduce the horizontal momentum of the eggs as they drop from the distributing conveyor, and thus prevent breakage caused by excessive impact of a descending egg against a previously deposited egg in an adjacent pocket of the egg container, transversely extending leaf springs 178 of slight concavity are secured to an elongated bar 1180 in vertical planes slightly ahead of the vertical planes defined by the downstream walls of the carton pockets. Said bar 1180 is suitably supported from the machine frame below the upper run of the distributing conveyor adjacent the inner flank thereof, as shown in FIG. 26. Thus, when eggs drop from the buckets 186 along the described trajectory 1177, they come against the concave faces of the leaf springs 1178, which absorb their horizontal momentum and deflect them smoothly into their proper pockets underneath, as illustrated in FIGS. 28 and 29B.

To dampen the fall of eggs released from the buckets 186 and thus protect them from damage through excessive impact with the floor and/or the side walls of the carton or cardboard grid underneath, two parallel coil springs 1182a and 1182b extending longitudinally of the distributing conveyor below the level of the buckets 186 (FIG. 28) are tensioned between brackets 1184 and 1186 that are secured to the hereinbefore described bar 1180 at either side of each battery of solenoids 680. Said springs are spaced apart in a direction transversely of the distributing conveyor by a distance slightly less than the maximum width of the smallest eggs to be handled by the machine, and are supported in pairs of apertures 1188a and 1188b provided in the hereinbefore mentioned baffle plates 1178 (FIG. 26). Said apertures 1188a and 1188b are of elongated shape in horizontal direction, as shown, so that the springs are free to yield laterally away from each other whenever an egg drops onto them. Hence an egg dropped from a bucket onto the springs may pass intermediately of said springs and will reach its proper carton or cardboard grid pocket with considerably less speed than the speed it would have reached if allowed to fall freely all the distance between the distributing conveyor and the carton or cardboard grid on the supply conveyor.

It remains to point out that to facilitate the transfer of filled cartons or cardboard grids from the feed conveyor 192 of a packing station onto the take-off ramp 193, sets of three power driven rollers 1190, one such set for each packing station, may be arranged to pass with their upper segments through appropriate slots 1192 in the base plate 1194 of the ramp as shown in FIGS. 6 and 7. All the rollers 1190 comprised in the machine of the invention may be mounted upon a common horizontally positioned drive shaft 1196 that extends along the front ends of the base frames of the eighteen packing stations. Said drive shaft may be driven from the hereinbefore mentioned motor 1060 at the end of the machine and for this purpose carries a sprocket 1198 (FIG. 4B) around which is trained the same endless sprocket chain 1058 that drives the common power drive shaft 1064 for all the eighteen carton feed conveyors 192 comprised in the machine of the invention.

From the foregoing description it will be seen that the present invention provides a particularly efficient carton storage magazine and means for dispensing cartons from the magazine. The novel impeller control mechanism makes it possible to accurately remove cartons from a magazine.

While I have described my invention with the aid of a particular embodiment thereof, it will be understood that I do not wish to be limited to the specific constructional details illustrated and described which may be departed from without departing from the spirit of the invention.

Also while the machine of the invention as illustrated in the accompanying drawings and as described in the specification was specifically devised, and is employed for processing eggs, it will be understood that a machine embodying the principles of the invention may also be usefully employed to segregate other articles, such as avocadoes, lemons, or other highly priced fruit.

I claim:

1. A carton magazine selectively adjustable to hold cartons of different size comprising a rectangular frame structure, members rigidly connected to one end bar and the side bars of said frame structure to form one end wall and the two side walls of the magazine, another member adapted to form the other end wall of said magazine, an arm arranged to pivotally support said last mentioned member from said frame structure for movement from a lower position adjacent the corresponding end bar thereof to an upper position removed inwardly therefrom, spring means urging said last mentioned member into said lower position, and a spring bolt secured to said last mentioned member and operable to slide over one of the side bars of said frame structure when said last mentioned member is in its upper position so as to retain it in said upper position.

2. In a magazine which is selectively adjustable to receive articles of different sizes, wall means including side and rear portions defining an upstanding article receiving compartment which is substantially rectangular in horizontal section, an elongated front wall portion, means mounting said front wall portion on said wall means for movement toward and away from said rear portion between contracted and expanded positions, respectively, while in substantially parallel relation to said rear portion, means yieldably urging said front wall portion away from said rear portion into said expanded position wherein said compartment is adjusted to receive articles of a larger size, and means on said front wall portion releasably engaging said wall means for retaining said front wall portion in said contracted position wherein said compartment is adjusted to receive articles of a smaller size.

3. In a magazine which is selectively adjustable to receive articles of different sizes, wall means including side and rear portions defining an upstanding article receiving compartment which is substantially rectangular in horizontal section, an elongated front wall portion, means mounting said front wall portion on said wall means for movement in a predetermined path toward and away from said rear portion between contracted and expanded positions, respectively, while in substantially parallel relation to said rear portion, resilient means interengaging said wall means and said mounting means and yieldably urging said front wall portion away from said rear portion, and a holding member mounted on said front wall portion for movement transversely of said path between a projected position engaging said wall means and releasably retaining said front wall portion in contracted position and a retracted position allowing movement of said front wall portion into expanded position.

4. A magazine for selectively adjustably holding cartons, and the like, of different sizes comprising a substantially rectangular frame including respectively opposed and upstanding end and side walls, an arm pivotally supporting one of said end walls from said frame for pivotal movement from a lower position spaced a predetermined distance from the other end wall to an upper position spaced closer to said other end wall than in said lower position, spring means urging said one end wall into said lower position, and a spring bolt secured to said one end wall for slidable engagement with said frame when said one end wall is in its upper position so as to retain said one end wall in said upper position.

5. A magazine for selectively adjustably holding cartons, and the like, of different sizes comprising a substantially rectangular frame including respectively opposed and upstanding end and side walls, means pivotally supporting one of said end walls from said frame for pivotal movement from a lower position spaced a predetermined distance from the other end wall to an upper position spaced closer to said other end wall than in said lower position, resilient means yieldably urging said one end wall into said lower position, and means secured to said one end wall for slidable engagement with said frame when said one end wall is in its upper position so as to retain said one end wall in said upper position.

6. In an article supply station including a substantially horizontal conveyor movable in a predetermined direction, a magazine supported above said conveyor for supplying articles of varied width and height to said conveyor, said magazine comprising wall means including side and rear portions defining a compartment upstanding from said conveyor and adapted to receive such articles for gravitational descent onto said conveyor, an elongated front wall portion having a lower edge, means mounting said front wall portion on said wall means for movement between a contracted position relatively closely adjacent to said rear wall portion and with said lower edge spaced a predetermined distance above said conveyor for accommodating articles of narrow width and greater height and an expanded position spaced farther away from said rear wall portion and with said lower edge spaced closer to said conveyor than in said contracted position for accommodating articles of greater width and lesser height, and means associated with said front wall portion for releasably maintaining said front wall portion in said positions.

7. In a magazine which is selectively adjustable to receive articles of different sizes, wall means including side and rear portions defining an upstanding compartment which is substantially rectangular in horizontal section and which is adapted to receive articles of different sizes, an elongated front wall portion, means mounting said front wall portion on said wall means for movement toward and away from said rear portion between contracted and expanded positions, respectively, while in substantially parallel relation to said rear portions, means yieldably urging said front wall portion away from said rear portion into said expanded position wherein said compartment is adjusted to receive articles of a larger size, means on said wall means and said front wall portion for limiting movement of said front wall portion away from said rear wall portion, and means for retaining said front wall portion in said contracted position wherein said compartment is adjusted to receive articles of a smaller size.

References Cited in the file of this patent

UNITED STATES PATENTS

| | | |
|---|---|---|
| 398,584 | Crandell | Feb. 26, 1889 |
| 638,325 | Ellsworth | Dec. 5, 1899 |
| 790,561 | Dierdorff | May 23, 1905 |
| 1,145,458 | Antoine et al. | July 6, 1915 |
| 1,313,487 | Juengst | Aug. 19, 1919 |
| 1,649,365 | Poling et al. | Nov. 15, 1927 |
| 1,688,368 | Walker | Oct. 23, 1928 |
| 1,747,387 | Paulson et al. | Feb. 18, 1930 |
| 1,910,367 | Schauweker | May 23, 1933 |
| 2,099,267 | Hackett | Nov. 16, 1937 |
| 2,249,234 | Srodulski | July 15, 1941 |
| 2,272,682 | Srodulski | Feb. 10, 1942 |
| 2,445,713 | Glassner | July 20, 1948 |
| 2,480,253 | Malhiot | Aug. 30, 1949 |
| 2,551,981 | Thompson | May 8, 1951 |
| 2,561,723 | Berger | July 24, 1951 |
| 2,589,600 | Burkholder | Mar. 18, 1952 |
| 2,602,556 | Sheehan | July 8, 1952 |
| 2,648,445 | Roessl et al. | Aug. 11, 1953 |
| 2,701,650 | Stevenson | Feb. 8, 1955 |
| 2,717,729 | Page et al. | Sept. 13, 1955 |
| 2,769,528 | Goodrich et al. | Nov. 6, 1956 |
| 2,780,342 | Good | Feb. 5, 1957 |